United States Patent [19]

Balboni et al.

[11] Patent Number: 4,890,281
[45] Date of Patent: Dec. 26, 1989

[54] SWITCHING ELEMENT FOR SELF-ROUTING MULTISTAGE PACKET-SWITCHING INTERCONNECTION NETWORKS

[75] Inventors: Gian P. Balboni, Turin; Giuseppe Giandonato, Rivalba; Riccardo Melen, Turin; Vinicio Vercellone, Venaria Reale, all of Italy

[73] Assignee: Cselt - Centro Studi E Laboratori Telecomunicazioni S.P.A., Turin, Italy

[21] Appl. No.: 118,520

[22] Filed: Nov. 6, 1987

[30] Foreign Application Priority Data

Nov. 18, 1986 [IT] Italy ................. 67854 A/86

[51] Int. Cl.$^4$ ............................. H04J 3/26
[52] U.S. Cl. .................... 370/60; 370/61
[58] Field of Search ............ 370/60, 61, 62, 94, 370/58

[56] References Cited

U.S. PATENT DOCUMENTS

| | | | |
|---|---|---|---|
| 4,651,318 | 3/1987 | Luderer | 370/60 |
| 4,701,906 | 10/1987 | Ransom et al. | 370/60 |
| 4,734,907 | 3/1988 | Turner | 370/60 |

FOREIGN PATENT DOCUMENTS 2165422 4/1986 United Kingdom ............ 370/60

OTHER PUBLICATIONS

H. J. Siegel et al., article "The Multistage Cube: A Versatile Interconnection Network", IEEE Computer, Dec. 1981, pp. 65–76.
Carver Mead et al., *Introduction to VLSI Systems*, (Addison-Wesley Publishing Co.), pp. 78,79; 157,158.
F. F. Sellers Jr. et al., *Error Detecting Logic for Digital Computers*, (McGraw-Hill Book Company), p. 258.

Primary Examiner—Douglas W. Olms
Assistant Examiner—Melvin Marcelo
Attorney, Agent, or Firm—Herbert Dubno

[57] ABSTRACT

The switching element for self-routing multistage packet-switching interconnection networks comprises: an input unit, composed of as many sections (IMA, IMB) as the element inputs are, each section comprising a FIFO memory (FIFA, FIFB) for packet buffering; a switch (SW) associated with a control unit (SCU) which, for each packet to be forwarded, sets up the connection requested for that packet between one input and one or more outputs of the element (ECP), on the ground of a routing tag associated with each packet and comprising a first and a second portion relative to normal routing and to broadcasting in the different stages of the network (RC), and solves possible routing conflicts between packets simultaneously arriving at different inputs; and an output unit, composed of as many sections (RU0, RU1) as the element outputs are and performing the whole of the functions necessary for the correct packet forwarding towards a destination. The control unit (SCU) of the switch (SW) is arranged to handle broadcasting of a packet independently of all other elements (EDP) in the same stage, so as to allow broadcasting also to a number of destinations different from a power of 2 (for an element with two inputs and two outputs) and cooperates with the memory (FIF) storing the packet to be broadcast in such a way that broadcasting does not give rise to internal blocking in the network (RC). Said control unit (SCU) moreover solves routing conflicts so as to set an upper bound to packet permanence time within the network (FIG. 2).

14 Claims, 11 Drawing Sheets

FIF

SWITCHING ELEMENT FOR SELF-ROUTING MULTISTAGE PACKET-SWITCHING INTERCONNECTION NETWORKS

FIELD OF THE INVENTION

The present invention relates to packet-switching interconnection networks and, more particularly, to a packet-switching element for a self-routing multistage interconnection network.

BACKGROUND OF THE INVENTION

It is known that a large group of multistage packet-switching interconnection networks includes networks comprising a plurality of identical elements connected so that any network output may be reached from any input. Examples of such networks are the so called omega, delta and Benes networks. In case of self-routing networks, the network elements are to:

analyze the tag identifying a packet destination and consequently route the packet towards the appropriate output;

solve possible routing conflicts; and buffer packets which cannot be immediately forwarded because of routing conflicts or unavailability of the subsequent network stage or of the destination device.

The latter function will be generally performed so as to set an upper limit to packet residence time in the network. This increases network efficiency.

In some applications, for instance within parallel processing structures implementing distributed algorithms or in telecommunications networks, other functions appear desirable, such as the capability of broadcasting the same message to a plurality of destinations, so that connection of one element input with a plurality of outputs must be possible.

A network consisting of elements having also that further capability is disclosed by H. J. Siegel and R. J. McMillen in the article "*The multistage cube: a versatile interconnection network*", IEEE Computer, December 1981, pages 65-76. That network consists of elements with two inputs and two outputs, comprising each a switch with a control unit that, on the basis of the information contained in the routing tag, sets up the appropriate connections of one input with one or more outputs. In the latter case, the connection may be set up either with two outputs whose addresses are in a given relationship, or with a greater number of outputs, provided that such a number is a power of 2. This implies that, in each network stage, all elements traversed by a message must have the same configuration. This limits the network efficiency, as a number of destination devices might receive no information or information which is not of interest and is then to be eliminated.

Moreover the article does not indicate how internal blocking of the network can be avoided in the case of information broadcasting or how an upper limit can be set to the residence time in the network.

OBJECT OF THE INVENTION

It is the object of the invention to provide a switching element for such networks, which allows broadcasting to be effected without originating permanent internal blocking of the network and so as to reach any number of destinations (even a number different from a power of the element output number), and which can solve routing conflicts in such a way that an upper limit is set to the packet residence time in the network.

SUMMARY OF THE INVENTION

According to the invention, there is provided a packet-switching element for self-routing multistage interconnection networks allowing broadcasting of the packets forwarded through the network. The packet-switching element comprises: an input unit, composed of as many sections as there are element inputs, each section comprising a FIFO memory for packet buffering prior to packet forwarding towards the output;

a switch associated with a control unit which, for each packet to be forwarded, sets up the connection requested for that packet between one input and one or more outputs of the element, on the basis of information contained in a routing tag associated with each packet and comprising a first and a second portion relative to normal routing and to broadcasting in the different network stages, respectively, and which solves possible routing conflicts between packets simultaneously arriving at different inputs; and an output unit, composed of as many sections as there are element outputs and performing all of the functions necessary for the correct packet forwarding towards a destination.

According to the invention the packet-switching element also includes:

means belonging to the switch control unit which, upon detection of a broadcasting request, are arranged for: evaluating the possibility of accepting that request by comparing a first parameter, related to the number of destinations to which a packet is to be broadcast, and a second parameter, related to the position of the stage to which the element belongs among all stages where broadcasting is requested and indicating the maximum number of network outputs which may potentially be seized for broadcasting of a particular message; accepting the broadcasting request if the first parameter is greater than or equal to the second one; generating, if the request is accepted, a signal for communicating this condition to the memory storing the packet to be broadcast, and generating also at least one modified routing tag to be sent over one of the element outputs concerned with the broadcasting, the broadcasting request being processed, in an element within a stage, independently of the processing of other broadcasting requests in other elements in the same stage; and means, belonging to the memory of each input unit section, for carrying out the actual broadcasting of a packet, in the presence of said signal generated by the switch control unit, through a plurality of consecutive readings of the same packet.

Broadcasting of a packet through a plurality of consecutive readings of same is the feature by which internal blocking of the network work is avoided.

BRIEF DESCRIPTION OF THE DRAWING

The above and other objects, features and advantages of our invention will become more readily apparent from the following description, reference being made to the accompanying highly diagrammatic drawing in which:

FIG. 1 is a schematic representation of a parallel processing structure employing an interconnection network consisting of packet-switching elements according to the invention;

SPECIFIC DESCRIPTION

FIG. 1 shows by way of example the application of the invention in a parallel processing structure comprising a plurality of processing units E1, E2 ... En which mutually exchange variable length messages through a self-routing multistage packet-switching network RC, consisting of a plurality of identical elements ECP which are the subject matter of the invention. By way of example, in the following description each such element will be supposed to have two inputs and two outputs. Each element ECP is to route towards one element in a subsequent stage or towards one network output (or towards two elements or outputs, in case of broadcasting) the packets received, to solve routing conflicts and to temporarily store packets that cannot be forwarded immediately. Moreover elements ECP are to allow connection of one input with either one output or a plurality of outputs (broadcasting) of network RC. As to broadcasting, each element ECP may operate independently of all other elements in the same stage, so that the number of users reached by a message can be different from a power of 2.

The messages forwarded through the network will consist of a number of packets which, in the most general case, comprise each: a tag consisting of two bit groups of which one (normal transmission tag) contains the actual routing information and the other (broadcast transmission tag) broadcasting information; a word indicating the packet length; a variable number of data words; and a check word (cyclic redundancy code) for checking the proper network operation. As to the tag, the network RC is such that each bit in both groups relates to a network stage, a logic value 0 or 1 of a normal transmission tag bit indicates the element output channel on which the message is to be forwarded, and a value 1 of a broadcast transmission tag bit indicates a broadcasting request. The two bit groups are simultaneously present. Bits of equal positions in the two groups concern the same stage.

Figure 2:
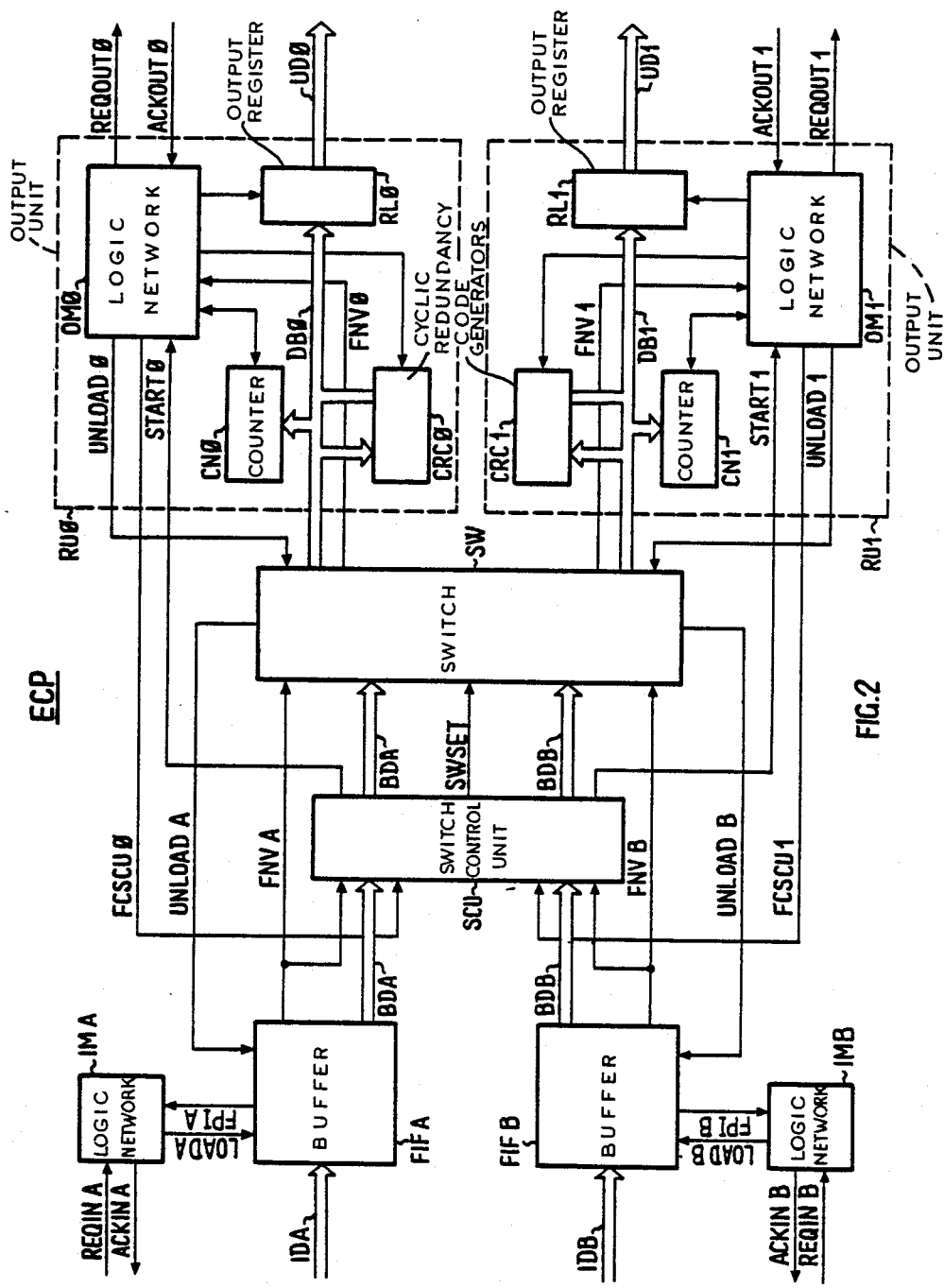
FIG. 2 is a block diagram of a packet-switching element.

In FIG. 2, switching element ECP comprises: two input buses IDA, IDB and two output buses UDO, UD1 with a number of wires as will allow parallel transmission of all bits in a packet word; actual switch SW with its control unit SCU; an input unit consisting of two identical sections (one for each of the two inputs IDA, IDB), and an output unit also consisting of two identical sections RUO, RU1, associated with outputs UDO, UD1 respectively; internal data buses BDA, BDB, connecting the two input sections with switch SW, and DBO, DB1 connecting switch SW with output sections RUO, RU1. In the following description, final letters A, B of the reference symbols characterize devices and signals relating to the respective input, and final digits 0, 1 denote elements associated with the respective output. Where no risk of confusion exists, that final character of the reference symbols will be omitted.

Each input section comprises a logic network IMA (and IMB, respectively) and a buffer FIFA (FIFB).

Logic networks IMA and IMB control writing into the respective buffer FIFA and FIFB, until filling thereof, of the data arriving at ECP through buses IDA, IDB, and manage the handshake protocol with the upstream devices (e. g. an element ECP of a preceding network stage).

Buffers FIFA AMFIFB are first-in, first-out (FIFO) memories temporarily storing packets which cannot be immediately forwarded to the subsequent stage; moreover, under the control of logic SUC, the buffers FIFA and FIFB allow broadcasting of a message, through two consecutive message readings. This way of performing broadcasting prevents permanent network blocking when variable length messages are handled in the network, as supposed. The structure of a parallel packet switch like SW is well known in the art and does not require a detailed description; however an example can be found in "Introduction to VLSI systems", by C. Mead, L. Conway, Addison Wesley Publishing Company, page 158.

Control unit SCU of switch SW is to: analyze routing requests contained in the normal routing tag; set up accordingly the connection between inputs BDA, BDB and outputs DB1, DB2 of switch SW (one input with one of the outputs, each input with a respective output, one input with both outputs in two subsequent steps); solve routing conflicts so as to establish an upper bound to the permanence time of a packet in the network; and manage the message broadcasting algorithm in a manner independent of all other elements in the stage.

As to conflict solution, when a conflict occurs, the identity of the message being delayed is stored and, at a subsequent conflict concerning the previously delayed message, the output channel is made available for it. Thus any message can lose only one conflict (in the exemplary embodiment of a 2×2 element), and this limits not only the overall transit delay through the network but also the delay variance for the different packets.

The broadcasting algorithm is based on a principle allowing a message to be broadcast to any number of destinations (even a number different from a power of 2) whose positions depend on the positions and the number of the stages where broadcasting is to occur. In a given network stage, the broadcasting request is accepted if a first parameter, related to the number of destinations the message is to be broadcast to, is greater than or equal to a second parameter related to the position in the network of the stage the element belongs to (and more particularly to the position of the stage among those at which broadcasting is to occur), said second parameter indicating the maximum number of stage outputs which may potentially be seized for message broadcasting.

More particularly, operation in network stage j is as follows. Let: BRD=b(n) ... b(j) ... b(1) the broadcast transmission tag; BUM, BU(M−1) . . . BU1 the m bits at logic level 1 in BRD; TAG the normal transmission tag; TUM, TU(M−1) . . . TU1 the bits that, in TAG, correspond with bits BUM . . . BU1 of BRD. Obviously, bits TU (i) of TAG relating to the stages where broadcasting is to occur are not significant for routing, as the message is to be routed over both outputs. After forcing bit TUM high (logic 1), if it is not yet high, such bits are utilized to form a binary number $Tc=1, TU(M-1) \ldots TU1$ which forms the first parameter. The original value of bit TUM is used to route the message after evaluation of broadcasting possibility, as will be disclosed hereinafter. If stage j is the k-th stage where broadcasting is requested ($1 \leq k \leq m$), the second parameter is $2^k$.

As said, broadcasting is effected only if $Tc-2^k \geq 0$. The value of that difference is used to build a modified normal transmission tag which is sent over one of the two output channels (namely, the one identified by the complement of bit TUM) whereas the original normal transmission tag is sent over the other channel. If the difference value is negative, a normal transmission is effected over the output channel identified by the complement of bit TUM leaving the normal transmission tag unchanged. As a result of the above algorithm, considering the set of $2^m$ units E1, E2, En(FIG. 1) whose addresses coincide in the n−m bits of BRD which are 0, according to the invention it is possible to broadcast a message to the first or the last Tc+1 units in that set (the units with the least or the greatest addresses, respectively) depending on the value of bit TUM. That algorithm is implemented for a given message independently of any other message dealt with in the same network stage.

Figure 3:
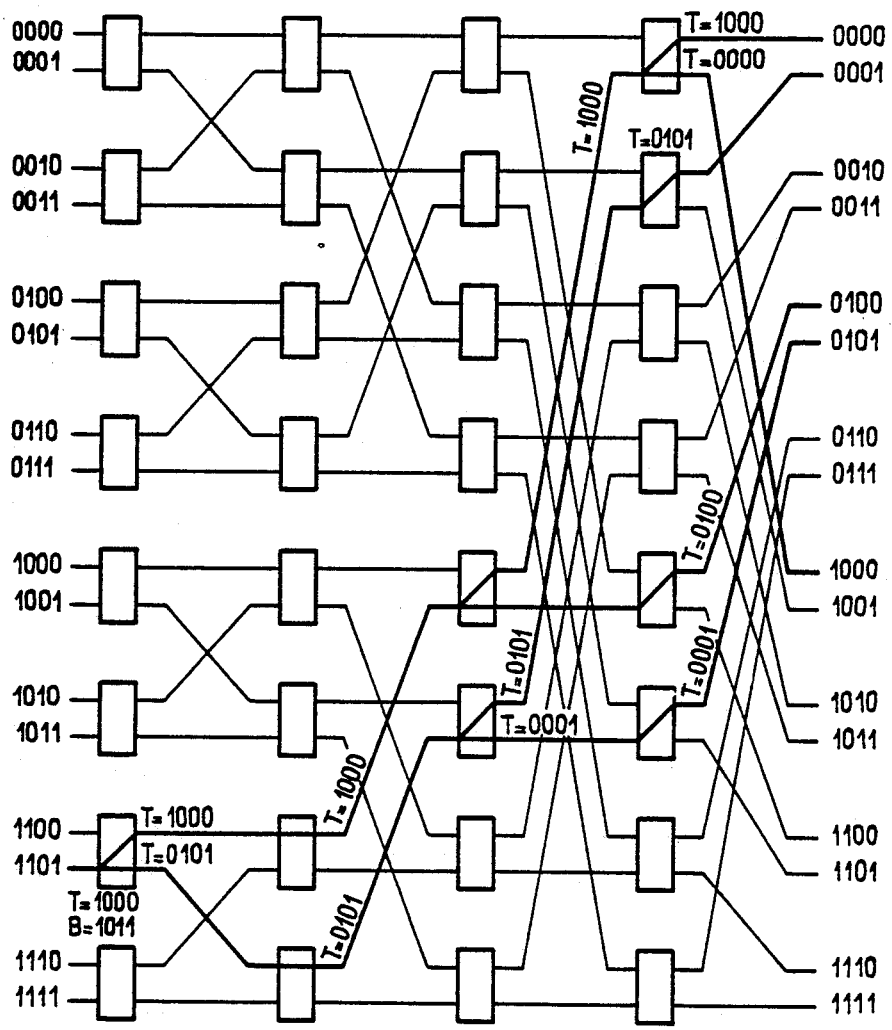
FIG. 3 is a diagram illustrating the message broadcasting algorithm.

An exemplary application of the above algorithm is shown in FIG. 3 for a 4-stage network, in case of a message in which tag portions TAG and BRD (shown at T, B respectively) are 1000 and 1101, respectively. Hence the bits in Tc are 100 and broadcasting concerns five outputs. It can be immediately appreciated that tag portions TAG at the outputs from the elements in which broadcasting is carried out and the addresses of the five network outputs meet the conditions above.

Coming back to FIG. 2, ouput unit RU0 (RU1) performs all functions relating to packet forwarding to the destination devices. Besides setting up the connection with (them) and hence managing the handshake protocol, the output unit also is to identify the length of the packet to be transmitted and generates and/or checks the cyclic redundancy code. As far as the latter is concerned, in a preferred embodiment of the invention said code is generated in the first stage of network RC (FIG. 1), is checked in the intermediate stages and is checked and eliminated in the last stage. To allow that procedure, the output unit will receive signals denoting whether it belongs to the first network stage, or to an intermediate stage or to the last stage. That code may already be present in the packets incoming to the network: in this case all stages will act as intermediate stages and will carry out only the check. In applications where the redundancy code needs not to be used, such information will be made available to the output unit which is then made free from a number of operations.

Each section of the output unit is here schematized by:

logic network OM (OM0, OM1) which is to control the output unit and to dialogue with the other devices of element ECP;

block RL which acts as output register of element ECP;

counter CN, that loads the word coding the packet length and counts, under the control of logic network OM, the number of transmitted words; and circuit CRC for generating and/or checking the cyclic redundancy code: that circuit essentially comprises a register and a combinatory network of EX-OR gates, which implements the particular polynomial chosen for the code; if data are transmitted in parallel (e.g. with an 8-bit parallelism), advantageously also the code is computed in parallel. See "Error Detecting Logic For Digital Computers", by F. F. Sellers, M. Y. Sao, L. W. Bearnson, McGraw-Hill Book Company, page 258.

The structure of blocks FIF, SCU, RU, OM is disclosed in greater detail with reference to FIGS. 5 to 15; the meaning of the various signals shown in FIG. 2 will become apparent from the description of the detailed Figures, where also the timing signals for the different blocks are shown. Only the state diagram is given for logic network IM> The circuit design of a network operating according to such a diagram is not a problem for the worker of ordinary skill in the art.

Figure 4:
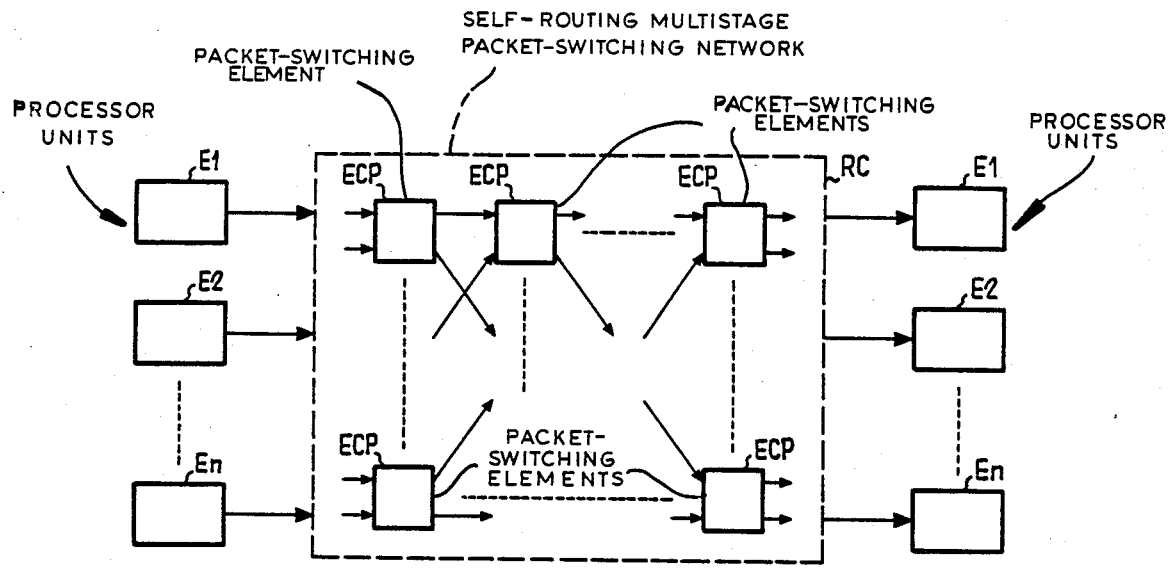
FIG. 4 is a diagram of the operation of a logic network of the input unit.

The operation of logic network IM (i.e. network IMA or IMB) of the input unit is now disclosed with reference to FIG. 4. Network IM receives the following signals:

REQIN, which is emitted by logic network OM (FIG. 2) of an output unit section RU of an upstream stage or by a unit E (FIG. 1) to indicate the existence of a data word to be sent to the switching element of which input logic is a part; and FPI, which is emitted by memory FIF (FIG. 2) to indicate that the memory is full. The logic circuit IMA or IMB emits the following signals:

ACKIN, which is sent to the device which has issued signal REQIN to confirm availability for data reception; and LOAD, sent to memory FIF to control data writing into the memory.

In the diagram description, it is assumed that said signals are active when at logic value 1. In correspondence with the various states or state transition, logic values of the different input signals are given in the same order as the signals are listed above. As usual, symbol "X" denotes the "don't care" condition for the signal value. The same representation modalities are followed for the other state diagrams.

Logic IM is initially in an idle state A1 where it remains, whatever the value of REQIN, if the memory is full (X, 1) or if no request arrives (0, X). If the memory is not full, IM leaves state A1 if forwarding of a data word is requested, and enters an active state B1 generating signals LOAD and ACKIN. IM goes back to state A1 when data loading is over, as indicated by REQIN becoming again 0. Signal ACKIN will remain active as long as IM is in state B1, as it is also to "freeze" the data present at the input of memory FIF for the whole time necessary to writing into the memory.

Figure 5:
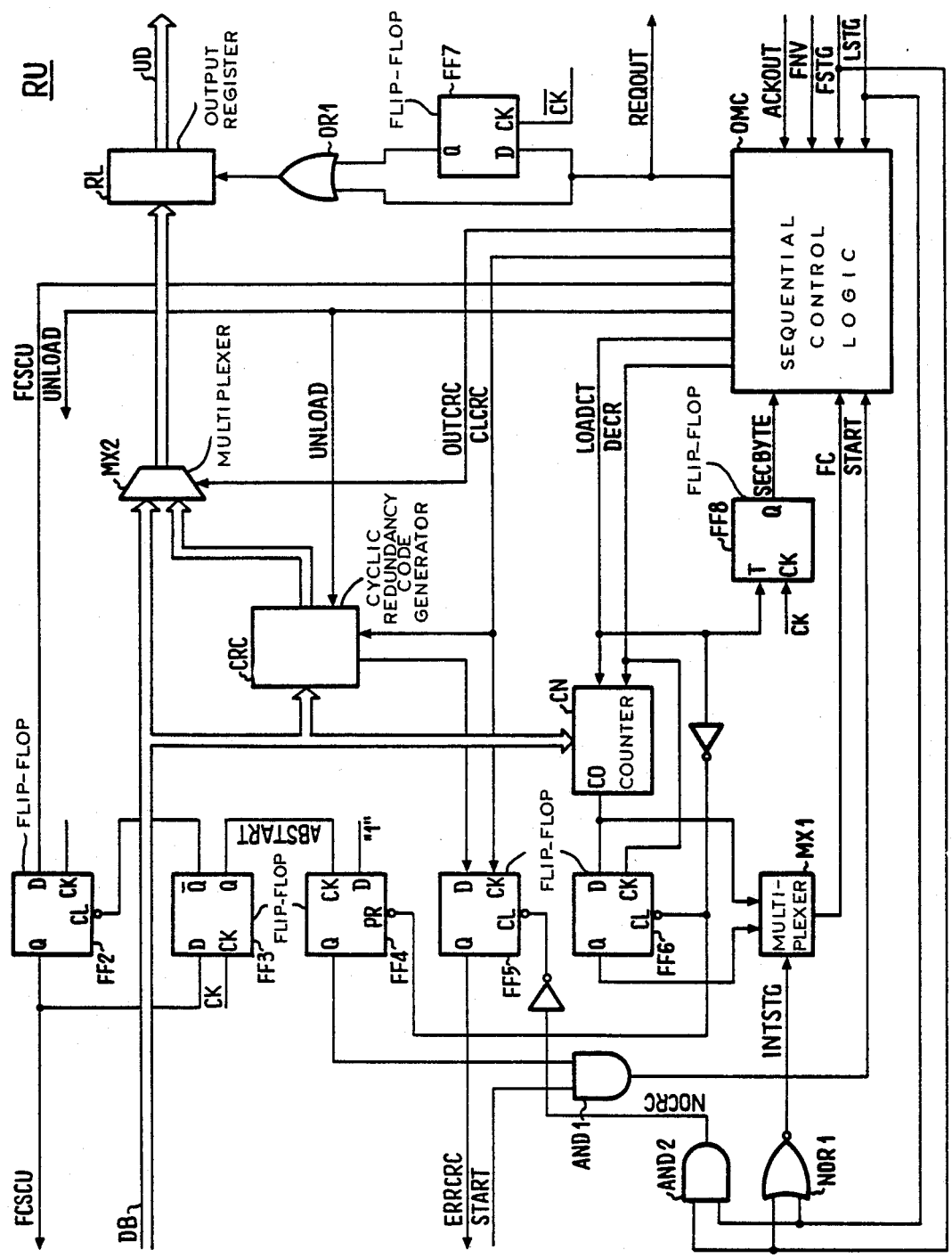
FIG. 5 is a detailed scheme of logic network of the output unit of the element.

FIG. 5 shows in greater detail the structure of a section RU of the output unit. Blocks CRC, CN and RL are the same as shown in FIG. 2. The remaining circuits form block OM of FIG. 2 and include:

a sequential control logic network OMC;

a first group of flip-flops and gates (FF2, FF3, FF4 AND1) for synchronizing the output unit with the switch control unit and managing handshake with the latter for the packet word transfer, (the specific functions of the elements of that group will become apparent hereinafter);

a second group of flip-flops and gates (FF5, FF6, FF8, AND2, AND3, NOR1, MX1) associated with counter CN and block CRC to take into account the possibility of different packet word lengths, the presence or absence of the check word and the position within the network of the stage that the element ECP is part of, for the sake of counting the number of words to be transmitted and forwarding to the switch control unit SCU (FIG. 2) the possible error signalling (the functions of the elements of this group will appear from the description of the operation of the control logic network; and a third group of flip-flops and gates (FF7, OR1) for data output synchronization.

A further multiplexer MX2 is provided to forward over output bus UD either the data present on bus DB or the check word generated by CRC. No reference symbol has been allotted to the various inverters necessary to take into account the logic level required by certain flip-flop inputs. To simplify the drawing, the general reset signal and the flip-flop inputs/outputs which are not of interest for the operation are not shown. Where a quantitative time indication is necessary, reference will be made to a clock signal OK having a period of 50 ns.

Logic network OMC, whose combinatory portion, due to the complexity of the operations carried out, will be made by a programmable logic array, will be described through the state diagram of FIG. 6.

As to the dialogue between an output unit RU and the switch control unit SCU, its management is allotted to circuits (namely the first group of flip-flops and logic grates) external to sequential control logic OMC and switch control unit SCU in order to avoid excessive burdening of these units. The dialogue protocol is based upon a command (START) of message transmission starting, generated by SCU, and an end-of-message signal (FCSCU) generated by OMC. Flip-flop FF2 causes signal FCSCU to remain high for only one period of clock signal CK; through FF3 signal FCSCU is also converted into a signal ABSTART, which through flip-flop FF4 and gate AND1 enables transfer of signal START to the sequential control logic OMC, thus making signal START impulsive.

Logic network OMC receives the following signals:

FSTG, LSTG, denoting that the packet-switching element ECP belongs to the first or the last network stage, respectively; these signals are also combined by gate NOR1 to indicate that the stage is an intermediate stage (INTSTG) while their logic product, effected by gate AND2, is a signal (NO CRC) indicating that the messages in the particular application do not contain the redundancy word;

START, already mentioned;

FC, which is, an end-of-count signal generated by counter CN and utilized by the sequential control logic OMC to detect that all the words in a message have been transmitted. FC is fed to the sequential control logic OMC through multiplexer MX1 controlled by signal INTSTG. FC is the actual carry-out signal of CN for the elements in the first or the last network stage or for applications which do not use the check word, whereas in the case of an intermediate network stage FC is the carry-out of counter CN delayed by one cycle period in flip-flop FF6; in effect in the latter case the message present on bus DB comprises one word more (the cyclic redundancy code) which is missing in the other cases;

FNV, which is fed through switch SW by buffer FIF (FIG. 2) of the input unit section connected with that section of the output unit, and which indicates that the buffer itself is not empty;

ACKOUT, acknowledging data receipt by the downstream device (this signal corresponds to signal ACKIN issued by the input logic network IM, (FIG. 2); and SECBYTE, indicating the presence of a second byte in the packet length word;

The sequential control logic OMC emits the following signals:

LOADCT, which is sent to counter CN to cause loading of the message length word and is issued when, depending upon internal timing signals of RU, logic network OMC recognizes the presence of that word on bus DB; signal LOADCT also clears flip-flop FF6 and presets FF3, and it is converted into signal SECBYTE through a T-type flip-flop FF8;

DECR, which is sent to counter CN to decrement by 1 its contents after transmission of each word of the message; this signal constitutes also the clock signal for FF6;

FCSCU, already mentioned, which is generated by the sequential control logic OMC after reception of FC;

UNLOAD, which, after reception of a word, is sent through switch SW to buffer FIF with which output unit RU is connected, to start reading of the subsequent word;

REQOUT, informing a downstream device that there is a message to be transmitted (the signal corresponds to signal REQUIN entering input logic network IM, FIG. 2);

CLCRC, sent to the cyclic redundancy code generator CRC to reset its contents, this signal being also the clock signal for flip-flop FF5 (reset by NO CRC) emitting signal ERRCRC indicating unsuccessful check by CRC;

OUTCRC, switching multiplexer MX2 so as to forward to the bus UD, at the end of a message, the word generated by CRC in case of elements ECP belonging to the first network stage.

Figure 6:
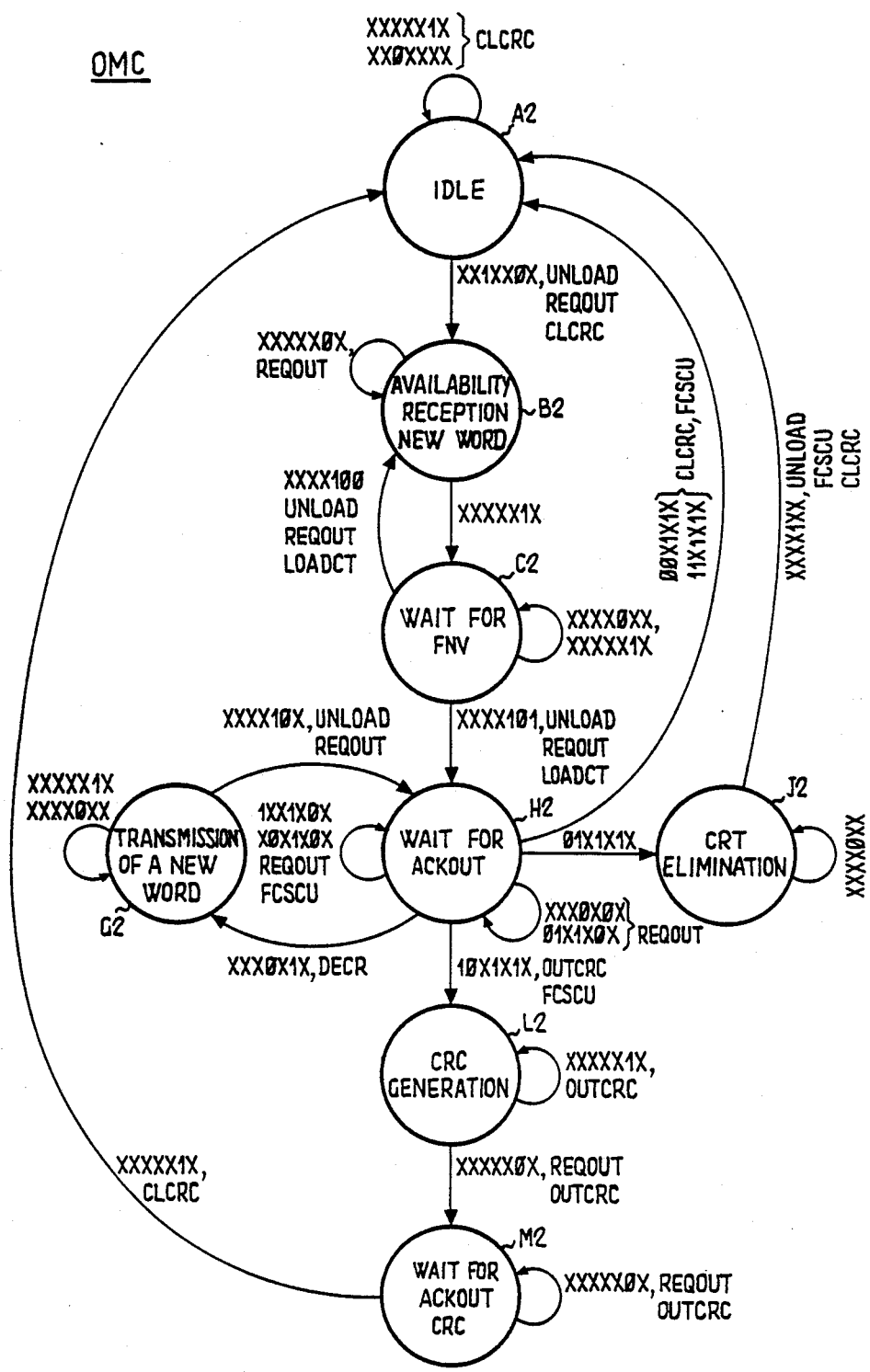
FIG. 6 is an operation diagram of the control unit of the logic network of FIG. 5.

The state diagram of FIG. 6 is now described.

Upon system activation, logic network OMC is caused to enter its initial (idle) state A2 by a general reset signal (not shown), and remains in this state until the arrival of the signal START keeping while signal CLCRC remains active.

Upon the arrival of thread START signal, logic network OMC passes to state B2 if signal ACKOUT is 0; this indicates the availability of the subsequent device to receive a new data word, in this case the first word of a message. Signals UNLOAD and REQOUT are emitted and signal CLCRC is kept active in this transition. Signal REQOUT is kept active as long as logic OMC remains in state B2 and, beside signalling the presence of data to be sent downstream, it holds in output register RL the word present at that instant on bus DB, to ensure its stability as long as is required by the input/output protocol. Signal UNLOAD is, on the other hand kept active only for a single clock signal period and causes the reading in the suitable memory FIF (FIG. 2) of the subsequent word to be transmitted, if that word is already available. Thanks to the simultaneous generation of those two signals, reading of a new word in memory FIF takes place simultaneously with the dialogue with the downstream device for sending it the preceding word. This optimizes the working cycle.

Logic OMC remains in state B2 as long as signal ACKOUT is 0; when ACKOUT becomes 1, network OMC passes to state C2 (wait for FNV), resetting signals REQOUT and CLCRC. In state C2 the reset of signal ACKOUT and the arrival of signal FNV indicating that memory FIF is not empty are awaited. These are the two conditions allowing the transmission of the subsequent word, which is the message length. If such conditions are met, logic circuit OMC resumes state B2 if signal SECBYTE is 0, and passes to state H2 (wait for ACKOUT) if SECBYTE is ; whatever the transition, signals UNLOAD, REQOUT and LOADCT are emitted. The latter causes loading in counter CN (FIG. 5) of the value of the message length. From that instant on, being signal CLCRC=0, signal UNLOAD acts also on circuit CRC generating and/or checking the cyclic redundancy code, causing the storage of the partial result of the computation of such code.

In state H2, logic (OMC waits for ACKOUT to become active and keeps REQOUT active. When ACKOUT arrives, four different operations are possible depending on the values of signals FSTG, LSTG and FC.

If FC is not 1 when ACKOUT becomes 1, the message is not yet at an end, and there are other words to transmit; logic OMC passes to state G2 of transmission of the subsequent word and emits command DECR to counter CN, which will therefore always indicate the serial number of the subsequent word to transmit. In this way, logic OMC can detect as early as possible the "end of message" condition and communicate it to the switch control unit SCU (FIG. 2) so that the switch control unit SCU can exploit for its operations also the time during which transmission of the last word of a message by the output unit takes place. In state G2, logic OMC waits for condition ACKOUT=1, FNV=1, as in state C2, and begins the transmission of a new word, resuming state H2. During this transition, only signals REQOUT and UNLOAD are generated to proceed with the normal transmission cycle if FC=0 (the subsequent word to transmit is not the last) or if element ECP belongs to the last network stage; if on the contrary FC=1 and ECP does not belong to the last network stage, or if the redundandy code is not provided for, logic OMC generates also signal FCSCU to inform SCU (FIG. 2) that the message transmission ends with the current word.

If FC is 1 when ACKOUT becomes 1, the next state of logic OMC depends on FSTG and LSTG. More particularly:

(a) element ECP belongs to the first network stage (FSTG=1, LSTG=0): logic OMC passes to state L2 (CRC generation) activating command OUTCRC which sets multiplexer MX2 so as to transfer the redundancy code onto output bus UD, since said code is to be generated and queued to the other words of the message only in the first network stage. Logic OMC remains in this state until the reset of ACKOUT, then it begins code transmission, activates the relevant signal REQOUT and passes to state M2 (wait for ACKOUT CRC), where the acknowledgment signal relating to the redundancy code is waited for from downstream devices. As soon as ACKOUT becomes 1, message transmission is ended and logic OMC resumes its initial state A2, activating signal CLCRC in order to be ready for the transmission of a new message;

(b) element ECP belongs to the last stage of the network (FSTG=0, LSTG=1): logic OMC passes to state J2 (CRC elimination) without generating commands. In this state the presence in memory FIF (FIG. 2) of the redundancy code is checked and, in the affirmative, that code is eliminated by generating a command UNLOAD towards memory FIF without transferring the datum onto output bus UD. At the same time the transmission end (FCSCU=1) is signalled to the switch control unit SCU. Signals UNLOAD, FCSCU are generated during the return to initial state A2, together with CLCRC; and (c) element ECP belongs to an internal network stage (FSTG=0, LSTG=0) or the network does not use the redundancy code (FSTG=1, LSTG=1): logic OMC recovers its initial state A2, activating signal CLCRC.

Figure 7:
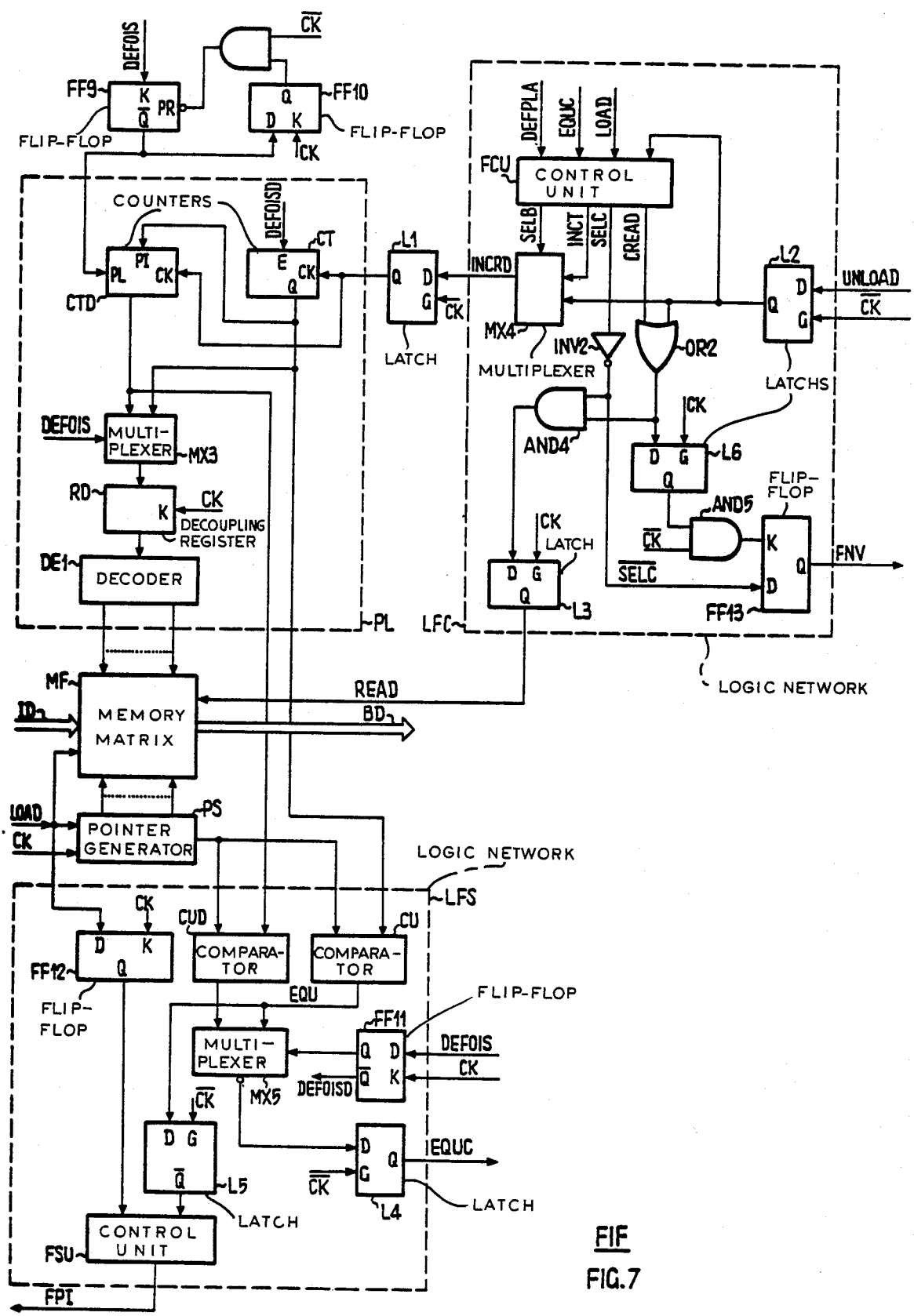
FIG. 7 is a block diagram of one of the FIFO memories.

With reference to FIG. 7, block FIF functionally comprises:

a memory matrix MF (which by way of example is can have a capacity of 64 8-bit words), with reading and writing pointers PL, PS;

a logic network LFS generating signal FPI indicating that memory MF is full;

a logic network LFC which basically is, to manage the operation of the reading pointer so as to avoid both idle times and reading of non-significant data; to signal logic network OMC (FIG. 5) of the concerned output section the presence of a valid datum on bus BD, and to solve possible access conflicts to the same cell of memory MF by an input and an output section of the element.

Matrix MF, which is to be accessed in pipeline from two different paths to allow simultaneous reading and writing operations on different cells, is advantageously a two-port memory, with separate input/output buses (buses ID, and BD respectively) and explicit reading command (READ) obtained either from the signal UNLOAD or from a signal CREAD emitted by a control unit FCU of logic network LFC with modalities which will be seen hereinafter.

The management of matrix MF as a FIFO is obtained by the circular-buffer addressing technique realized by pointers PL, PS. Said pointers comprise a counter CT which, under the hypothesis that memory MF stores 64 words, is a 6-bit counter, a decoupling register RD and a decoder DE1 for decoding the 6 bits of the count to select the row concerned by the demanded operation. Said elements are shown only for reading pointer PL. PL comprises also a second counter CTD, which is used alternately with counter CT for broadcast transmission, and a multiplexer MX3 to connect either counter to decoupling register RD.

The presence of a twofold reading pointer is the architectural solution allowing broadcasting of a message by sending it in sequence to both output gates. The first transmission of the whole message (controlled by counter CTD) and its retransmission (controlled by counter CT) follow each other in sequence and, from the theoretical point of view, they can be considered as a sequence of two normal (non-broadcast) transmissions.

It is to be noted that no particular configuration of switch SW is demanded by that particular implementation of broadcast transmission; besides, simultaneously with the management of a broadcast transmission relevant to one of the two input channels, another compatible transmission, it too possibly a broadcast transmission, can take place.

Decoupling register RD is to allow the counter and the decoder of each pointer PL, PS to operate in pipeline, so as to allow the contemporary emission of memory reading/writing command and counter increment signal. Reading/writing will thus be carried out on cell N of memory MF while the counter is already switching to N+1, thus preparing the address of the next cell to be acceded. In the reading pointer, register RD allows also superposition of counter and decoder switching delays and is indispensable in order to ensure a certain minimum time for decoding operations. In fact the data request signal UNLOAD would require, as an operation sequence, first the counter increment and then the new datum reading: were these operations to be carried out in subsequent times, too short a time would be left for decoding the counter output signal before the reading operation. This problem does not exist for the writing, since loading signal LOAD would require the inverse sequence (writing of a new datum, counter increment) which does not impose time requirements on the address decoding different from those already imposed by the desired reading/writing frequency (for instance, an operation every 100 ns, with the exemplary value of the clock signal considered here).

In examining in greater details the pointer structure, it will be understood that counter CT is incremented by a signal INCRD which consists of either the signal UNLOAD or a signal INCT emitted by control unit FCU. A multiplexer MX4, controlled by a signal SELB, this too generated by control unit FCU, supplies counter CT with either signal.

Signal INCT increments counter CT independently of the presence of signal UNLOAD coming from logic network OM (FIG. 2). This is necesary when a datum is written into the empty FIFO memory: in that case both the reading in memory MF and the corresponding increment of the pointer counter CT are to be controlled by signals directly generated by LCF (CREAD and INCT respectively), because under these conditions the operation cannot be controlled by signal UNLOAD, which is not generated when signal FNV indicating "non-empty memory" is 0.

Counter CTD is incremented by the same signal INCRD as counter CT and it loads the contents of the latter upon command of a signal DEFOIS, emitted by control unit SCU of switch SW (FIG. 2), when a broadcast transmission is desired. To this aim signal DEFOIS is converted into a pulse of suitable duration by the circuit composed of flip-flops FF9 and FF10 (the latter being clocked by CK) and gate AND3, enabled by CK. The same signal DEFOIS forms the select for multiplexer MX3 and is delayed in a further flip-flop FF11, clocked by CK, generating at its complement output a signal DEFOISD which is supplied to counter CT to disable its counting during a broadcast transmission.

The address emitted by counter CT or counter CTD is loaded in decoupling register RD upon command of signal CK.

The devices of writing pointer PS operate in a way perfectly analogous to that examined for reading pointer in case of non-broadcast transmission; counter increment command is in this case signal LOAD emitted by input logic IM (FIG. 2).

The contents of counters CT and CTD are respectively supplied to two comparators CU, CUD, of logic network LFS. These comparators receive also the contents of the counter of writing pointer PS, and emit a signal which is 1 when the values present at both inputs are equal. The comparator outputs are connected to the two inputs of a multiplexer MX5, transferring to the output the result of the comparison made by the comparator connected to the counter active at that moment counter (CT for normal transmission or retransmission of a message to be broadcast, counter CTD for the first transmission of a message to be broadcast). The select signal for positioning multiplexer MX5 on the input connected to comparator CUD is signal DEFOIS transferred to multiplexer MX5 via the true output of flip-flop F11. The complemented output signal of multiplexer MX5 is a signal EQUC which is transferred to logic network FCU which uses it for generating signal FNV of non-empty FIFO memory (valid datum) to be sent to unit SCU (FIG. 2) and, through switch SW, to the concerned logic network work OM. Said signal FNV is present at the output of a flip-flop FF13.

The output signal of CU (signal EQU) is also sent to control unit FSU of LFS which, on the basis of such a signal and of signal LOAD, generates signal FPI. The operation of control unit FSU will be described hereinbelow, with reference to FIG. 8, under the form of state diagram; circuit implementation does not present any problem to the skilled worker in the art.

Figure 8:
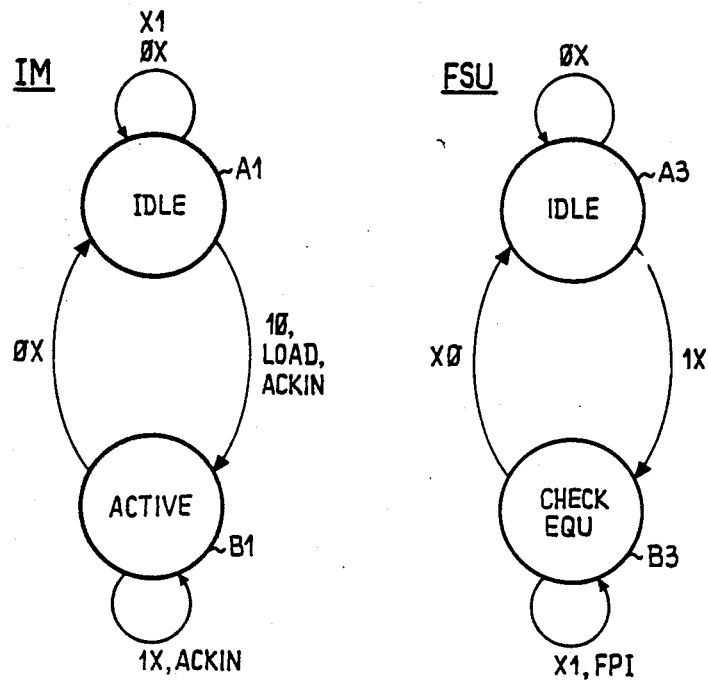
FIGS. 8 and 9 are operation diagrams of two logic networks of FIFO memory of FIG. 7.

As shown in FIG. 8, control unit FSU is a two-state logic network. It remains in its first state (A3, idle) until the arrival of a signal LOAD, whatever the logic value of EQU. Upon reception of a signal LOAD from IM, control logic FSU passes to its second state (B3, EQU check) to check, at the subsequent clock signal pulse, the value of EQU; if EQU is 0, FSU control logic returns to its initial state; if on the contrary EQU has become 0, signal FP1 is emitted and is kept active as long as EQU value remains the same.

It is worth noting that signal EQU designed to generate the "full memory" signal FPI is always obtained as a result of the comparison between writing pointer counter and counter CT (FIG. 7): During the first transmission of a message to be broadcast, counter CT is "frozen" and determines the limit address for writing in memory MF. In fact, if the value indicated by counter CT is exceeded, data will be cancelled which have been already transmitted and yet are to be used again for the second transmission. Consequently, the length of a message to be broadcast cannot exceed the capacity of memory MF, but this is not a severe limitation.

Coming back to FIG. 7, block LFC comprises control unit FCU and a set of logic circuits interfacing LFC with the other elements of buffer FIF or with the outside.

Unit FCU receives the following signals:
DEFPLA a pulse signal indicating broadcast transmission; and
LOAD, UNLOAD, EQUC, already examined;
The block LFC emits the following signals:
SELB, already examined;
SELC, which updates signal FNV of valid datum;
CREAD, generating the reading command for MF, when such reading is controlled by LFC, and controlling the updating of FNV by SELC; and
INCT, already examined.

Signal DEFPLA is obtained from signal $\overline{\text{DEFOIS}}$ with modalities similar to those by which the loading command for counter CTD is obtained from DEFOIS. Signal CREAD is fed to one of the two inputs of a gate OR2 which receives also signal UNLOAD; the output of gate OR2 is connected to an input of a gate AND4, enabled in the absence of SELC (as indicated by inverter INV2), in order to generate signal READ and through a timing element or latch L6 and a gate AND5 enabled by $\overline{CK}$, controls the updating of FNV.

The drawing also shows further timing elements or latches L1 ... L5, determining the suitable time phases for signals INCRD, UNLOAD, READ, EQUC, EQU. L6 properly times the clock signal for flip-flop FF13.

Figure 9:
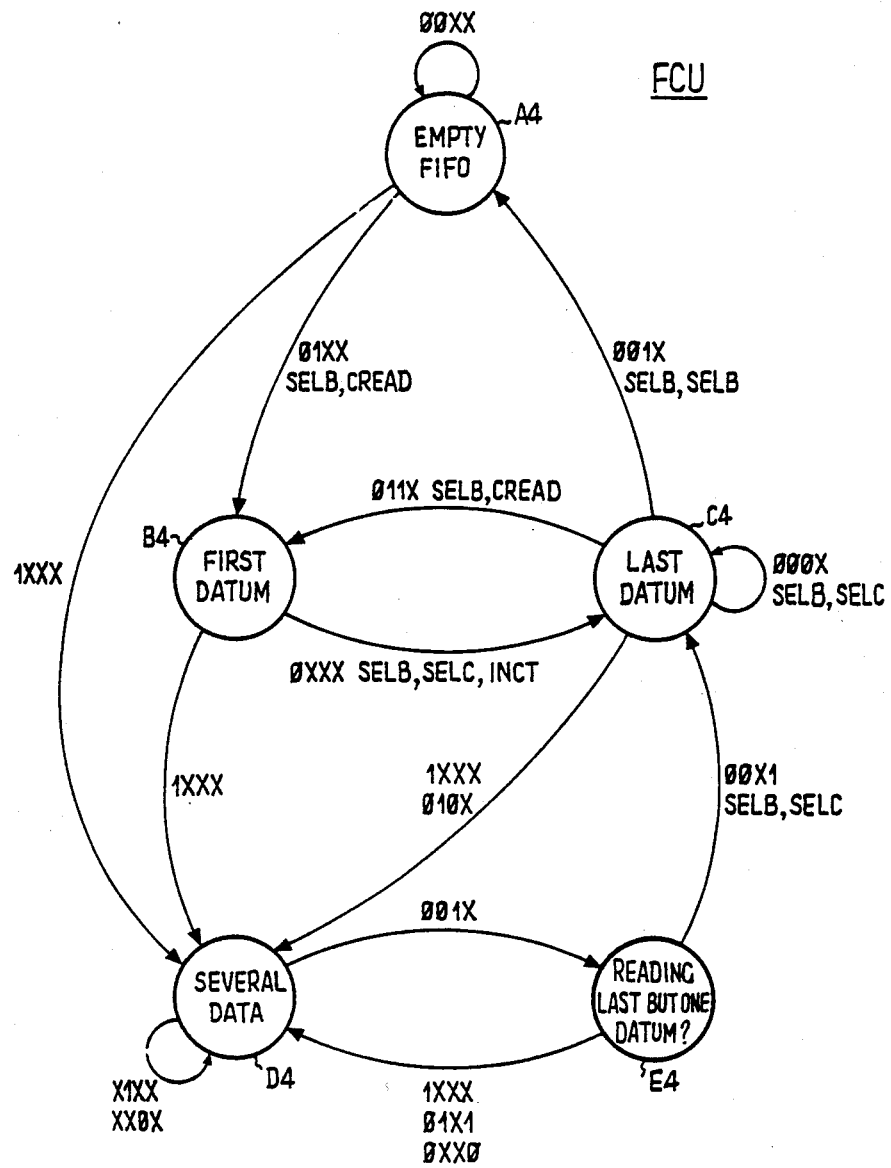

The operation of control unit FCU will be now described with reference to the diagram of FIG. 9.

Unit FCU is first in a state A4, corresponding to the condition of empty memory MF. Under this condition the addresses generated by both pointers PL, PS obviously coincide and a nonsignificant datum is present on the output bus BD of memory matrix MF; that is why signal FNV (valid datum signal) is 0. The control unit FCU remains in that state until it detects a loading into memory MF by the input section (LOAD signal coming from input logic IM, FIG. 2, becoming 1). Under this condition the control unit FCU passes to state B4 (first datum in the memory) emitting signals SELB and CREAD. Signal SELB acts on multiplexer MX4 so that the reading pointer increment is controlled by control unit FCU. Since SELC=0 (and consequently $\overline{SELC}$=1), signal CREAD can be transferred to latch L3 through gate AND4 to control the reading of the datum just loaded into memory MF, which operation will be carried out in the subsequent cycle. The same signal CREAD, through L6 and gate AND5, causes signal $\overline{SELC}$ to be transferred to the flip-flop FF13 output as a signal of valid datum FNV.

At the subsequent cycle of CK, control unit FCU passes from state B4 to state C4 (last datum). In effect, owing to the hypotheses made, two data to be loaded in memory MF can never arrive in adjacent cycles of CK. In transition B4-> C4, control signal SELB is kept present to slave memory reading to LFC, and INCT is emitted to increment counter CT and cause it to point the next cell to be read in MT, which cell, in this case, does not yet contain any significant datum. Also signal SELC is emitted and consequently the next signal UNLOAD coming from OM and supplied to flip-flop FF13 through latch L2, gate OR2, latch L6 and gate AND5 resets FNV.

Control unit FCU remains in state C4 as long as a single valid datum is present in memory MF; as soon as a signal LOAD arrives from input logic IM, or a signal UNLOAD arrives from logic network OM, control unit FCU enters a new state.

If signal UNLOAD arrives first, memory MF becomes empty again and control unit FCU resumes state A4; if signal LOAD arrives first, MF contains more than one datum and FCU passes to state D4.

If a signal LOAD and a signal UNLOAD arrive at the same time, this means that the datum present at the output of memory MF (the only datum present in the memory matrix) has been already used by the output unit which now requires the next datum, and yet this one is presently being written into memory MF by input logic IM. This is the case of attempt of pipeline operation on the same memory cell. Such a conflict is solved thanks to the fact that signal SELC, active as long as control unit FCU remains in state C4, inhibits through inverter INV2 and gate AND4 the actual reading of the memory matrix while resetting FNV. As a result of the reading operation the logic network OM receives from BD a non-significant datum associated with a signal FNV=0. Control unit FCU recovers state B4 and activates signal CREAD, which during the subsequent cycle will command a reading operation in MF. Consequently the new datum is transferred onto the output bus and the presence of a valid datum is signalled. At the subsequent step control unit FCU will return to C4 repeating the already-described cycle.

State D4 corresponds to a condition in which several data are present in memory MF. This is a state in which control unit FCU is basically inactive. Since memory MF now contains at least two data, there is no longer possibility of conflict between the pointers and the operations on memory MF can be carried out in a parallel and non-synchronized way by both input logic IM and logic network OM. In order to detect when memory MF again stores a single datum, demanding a new active intervention of control unit FCU, control unit FCU passes to state E4 (reading of the last but one datum) whenever it detects the presence of a reading without a simultaneous writing (UNLOAD=1, LOAD=0). In state E4 control unit FCU takes into consideration the signal EQU obtained as a result of the comparison between the addresses generated by the two pointers. If EQU becomes 1 in the cycle subsequent to the UNLOAD event, then MF contains only a last valid datum, while the reading pointer already an empty cell. Control unit FCU recovers state C4. Otherwise, control control unit FCU resumes state D4 without carrying out any operation.

In any state of control unit FCU, the passage to 1 of DEFPLA, indicating the broadcast transmission, causes the passage to state D4. In fact for the message retransmission, control unit FCU is to operate as if memory MF contained more than one datum, independently of the actual extent of filling up of the memory reached at the end of the first transmission. In fact from the logic point of view memory MF contains at least all the data of the message to be retransmitted.

Figure 10:
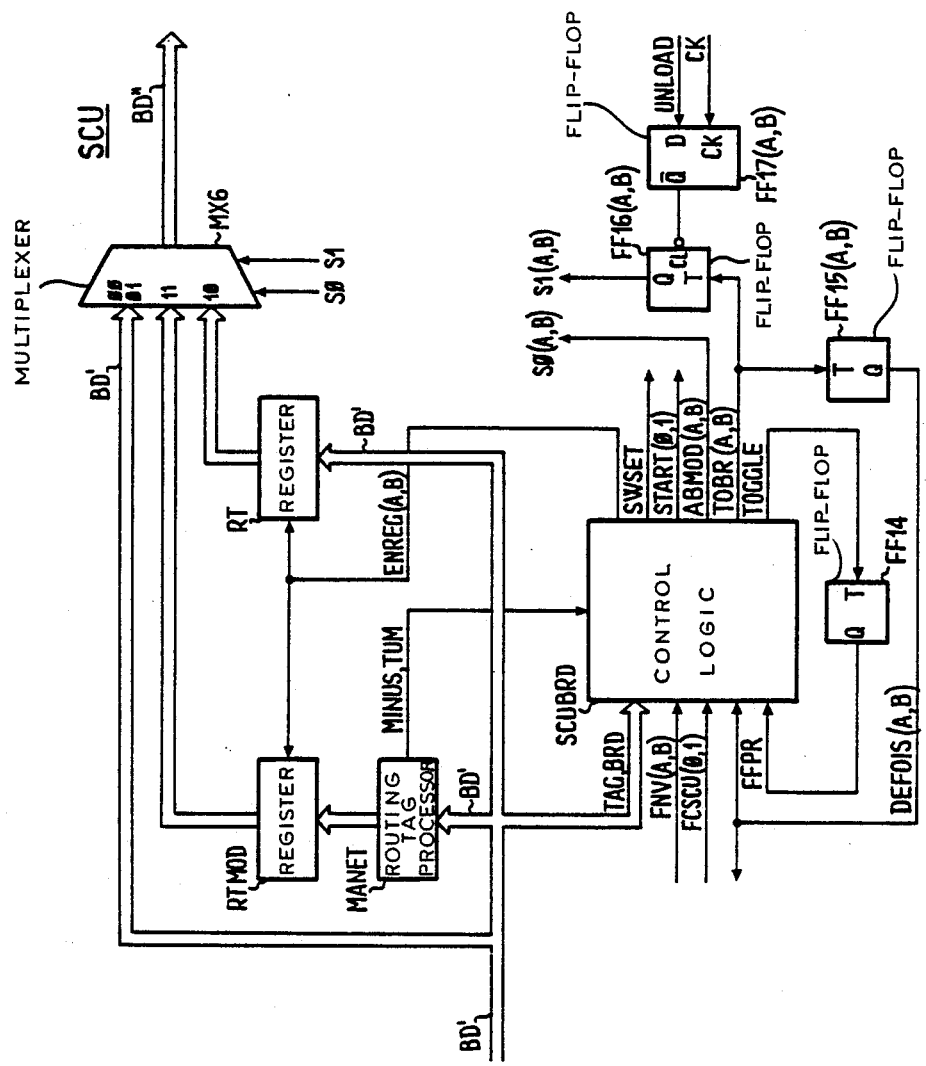
FIG. 10 is a block diagram of the switch control unit.

Reference will now be made to FIG. 10 representing control unit SCU of switch SW. For sake of clarity, in that Figure BD', BD" denote the input and output sections of internal data channel BD of FIG. 2. Block SCU basically consists of:

a finite-state automaton (or control logic) SCUBRD, whose input/output signals will be specified hereinafter and the operation listing is annexed as Appendix 1;

a device MANET processing the routing tags: in case of broadcast transmission request in its stage, MANET operates on the tag bits in accordance with the computing algorithm previously described to determine the possibility or impossibility of carrying out that transmission and, in the affirmative, modifies the tag itself. The structure of routing tag processor MANET will be described hereinbelow, with reference to FIGS. 12 to 15;

two registers RTMOD, RT, storing the tag modified by routing tag processor MANET and the original one present on bus BD', respectively; a multiplexer MX6 having three inputs connected to bus BD', register RTMOD and register RT, respectively, and an output connected to bus BD". Multiplexer MX6 is controlled by a pair of bits S1, S0 the first of which indicates whether data or the routing tag are to be transferred onto bus BD", while the second, in case of tag forwarding, indicates from which of the two registers the tag is to be extracted;

a first flip-flop FF14 storing the routing conflict result;

a second flip-flop FF15 storing the condition of double transmission of a broadcast message; and a further pair of flip-flops FF16, FF17, of which FF16 emits bit S1, while FF17, upon command of signal UNLOAD, causes S1 to switch after tag transmission.

Logic SCUBRD and flip-flop FF14 are common to both channels. The other elements are, by contrast, associated with each switch input channel, only one being represented in the Figure for the sake of simplicity. Besides, in the Figure the bit which is of interest for SCUBRD in each of the two tag portions is denoted by the reference symbol already used for the whole tag portion.

Logic SCUBRD receives the following signals:

TAG(A, B): bit of the normal transmission tag indicating on which output channel the message coming from input channel A or B, respectively, is to be routed at that stage. By way of example it is supposed that values 0 and 1 of TAG correspond respectively to routing on channels 0 and 1. Since transmission is effected in parallel, bit TAG is present on a wire of BD' different from stage to stage. In any stage j, the proper wire is selected through a multiplexer (not shown) controlled by a signal coding stage number j;

BRD(A, B): bit of the broadcast transmission tag indicating, when 1, the broadcast transmission request in that stage from one of the input channels. Bit BRD is extracted from bus BD' in the same way as TAG;

FNV(A, B): valid datum signal for one of the input channels;

FCSCU(0, 1): signal indicating transmission end on output channel 0 or 1, respectively;

DEFOIS(A, B): signal indicating the necessity of repeating the transmission to broadcast the message present on one of the input channels;

FFPR: priority signal generated by flip-flop FF14 which is used to solve routing conflicts and whose logic value indicates which of the channel the message delayed at the preceding conflict came from;

TUM(A, B): bit of the normal transmission tag corresponding to bit BUM(A,B) in the broadcast transmission tag. Bit bit TUM is extracted from the tag by the routing tag processor MANET and supplied to control logic SCUBRD to decide the routing upon a broadcast transmission request; and MINUS(A, B): signal supplied by MANET and indicating the negative result of the subtraction $Tc-2^k$ effected in order to decide whether or not broadcast transmission from the relevant input channel is to be carried out.

The output signals of control logic SCUBRD are:

SWSET: control signal for switch SW. SWSET=0 means e.g. straight connection through the switch (inputs A, B connected with outputs 0, 1, respectively; see FIG. 2). SWSET=1 means exchange connection (inputs A, B connected with outputs 1, 0, respectively);

START(0, 1): signal activating one of the output units;

TOGGLE: signal switching flip-flop FF14. It is set whenever SCUBRD delays the transmission of a message owing to a routing conflict;

TOBR(A, B): signal indicating the beginning of a broadcast transmission phase. This signal is converted into signal DEFOIS by flip-flop FF15 and into bit S1 by flip-flop FF16;

ENREG(A, B): signal enabling the writing into the two registers RTMOD, RT of the tag for the corresponding input channel; and ABMOD(A, B): signal forming control bit S0 of multiplexer MX6.

The operating principles of control logic SCUBRD will be now shortly illustrated in order to point out the most typical features. The detailed algorithm description of the operation of SCUBRD is given as Appendix 1: that description is a version in text form of the state diagram which is not illustrated because, owing to the very high number of states, transitions between states and conditions originating such transitions, the diagram would be impossible to understand.

The starting state of the operations of control logic SCUBRD is an idle state A5 (WAIT). It is reached as a consequence of the element initialization and whenever the element itself has no message to transmit.

Logic SCUBRD analyzes in this state the transmission requests (normal or broadcast transmission) which can be presented by the element input units. In the absence of requests, control logic SCUBRD remains in state WAIT; if there are one or more routing requests, control logic SCUBRD operates differently depending on the type of request. For simplicity of description normal and broadcast transmissions are considered separately, even if actually the two transmission types can coexist.

When logic SCUBRD recognizes a normal transmission request, indicated by signal FNVA or FNVB being 1, it analyzes the routing bit (TAGA or TAGB) concerning the stage it belongs to. Obviously, if the request arrives from only one channel, only bit TAG relevant to that channel is significant. Control logic SCUBRD enters one out of states B5, C5, D5 or E5 depending on the channel the request comes from and the demanded switch position, setting signal SWSET to the proper value and activating signal START relevant to the desired output channel. If both signals FNVA, FNVB are 1, bits TAGA, TAGB are to be compared to ascertain whether the two transmissions are compatible, i.e. whether the two messages are to be forwarded on different channels. If the two bits TAGA, TAGB are different, the two transmissions are compatible and control logic SCUBRD passes to state F5 or to state G5, depending on the requested switch position, and starts the operations on both output channels. If the two transmissions are incompatible, SCUBRD passes to one of the four states B5, C5, D5, or E5, as in the case of single request, depending on which message is allotted the priority by flip-flop FF14 and which output port is to be engaged by said message. During said transition, corresponding to transmitting one message while delaying the other, signal TOGGLE is activated which causes storage in flip-flop FF14 of the identity of the channel the delayed message calme from, so that a subsequent conflict, if any, is solved in its favour. The choice of the message to be delayed at the first conflict will be generally random and depends on the state taken by flip-flop FF14 during the initialization phase.

In states B5, C5, D5, E5, F5, G5, the operating principle of control logic SCUBRD is the same, but the operations are started by the reception of signals FCSCU0 or FCSCU1 (from the logic networks OM0; OM1 controlling output channels 0 and 1, respectively) which indicate that the preceding message has been completely transmitted on the relevant channel. Then control logic SCUBRD examines signals TAG and FNV relevant to input unit section no longer concerned in the transmission and establishes a new input/output connection, activating the necessary START signals, setting by SWSET the switch and effecting the transition towards the convenient state, or it recovers idle state WAIT.

It is to be appreciated that, when control logic SCUBRD is in one of the states characterized by a single active input-output connection (states B5, C5, D5, E5), it constantly checks, analyzing the relevant signals TAG and FNV, if a new routing request occurs on the presently inactive input channel. If that new request is compatible with the connection already existing, it is immediately satisfied and SCUBRD enters a double-transmission state (F5 or G5). Is the new request in conflict with the existing connection, the message is delayed and the identity of the channel it comes from is stored in flip-flop FF14 to give priority to said message when the request is analysed again.

In case of broadcast transmission request, which is denoted by bit BRD relevant to the stage being 1, the operations carried out by control logic SCUBRD are more complex, since two phases are provided:

(1) check of the admissibility of the broadcast transmission request, based on the previously described algorithm, whose computations are carried out by routing tag processor MANET;

(2) control of broadcast transmission as a sequence of two normal transmissions, as already explained in connection with the description of FIFO memories.

That being stated, if the request is identified in the idle state, control logic SCUBRD passes to one of two states of check of the request validity (BRFROMA or BRFROMB) according to the value of bit TUM. Such a bit in fact identifies the output channel on which the message is to be transmitted in any case, i.e. even though the broadcasting request is not admissible for the element ECP considered. During the transition from one state to the other, the loading of the two registers RT and RTMOD is enabled through signal EN-REG(A, B). Register RTMOD stores the result of the subtraction of parameter $2^k$ from number Tc, whose bits are scattered inside the routing tag as said before.

In the states of check of request validity, signal MINUS coming from MANET is considered. If MINUS is 1 (Tc$-2^k<0$), then broadcasting is not possible and control logic SCUBRD passes to the state corresponding to normal transmission on the channel indicated by complemented bit TUM. If MINUS is 0, then the transmission is to be handled as the first step of a broadcast transmission and control logic SCUBRD reenters the same state by activating the flag of "broadcast transmission started" for the given input channel (TOBRA or TOBRB at 1 for input A or input B, respectively) and positioning multiplexer MX6, for tag transmission, on the input connected to register RT (signal ABMOD=0).

The fact that the broadcast transmission request for a given input channel still requires the second transmission phase is stored in flip-flop FF15. Whenever a transmission ends, control logic SCUBRD checks the state of such a flip-flop (inputs DEFOIS(A/B), where DEFOIS=1 indicates that the second transmission phase is still to occur) and acts consequently, by positioning multipler MX6 so as transmit as TAG the modified tag and by switching signal SWSET so that the transmission takes place on the other output channel.

If in the idle state of control logic SCUBRD (WAIT), the broadcast transmission request simultaneously appears on both input channels, a priority choice is made based on the value of flip-flop FF14. Yet this one is not switched in order the alternate priority mechanism valid for normal transmissions is not affected. This corresponds to allotting a random priority to the messages, in case of routing conflicts between messages to be broadcast.

The operation of control logic SCUBRD in case the broadcast transmission request occurs while a normal transmission is being effected (control logic SCUBRD in states B5, C5, D5, E5) is the following: the end of the pending transmission (signalled by FCSCU0 or FCSCU1, as the case may be) is waited for and then the possibility of effecting the broadcast transmission is analyzed by the same procedure disclosed for state WAIT. This is possible for all the cases with the exception of a new broadcast transmission request appearing during the second phase of a precedent broadcast transmission (case in which the requests identified by code PRIMOBR(A,B) coexist with the requests identified by code SECONBR(B,A) under the conditions specified in the part CASE of the above states, see Appendix 1). In this case first the phase of second transmission is ended and afterwards the new broadcast transmission request is served. In all the other cases logic SCUBRD passes to state BRFROM(A/B) and then it serves the broadcast transmission request.

If the broadcast transmission request appears in state F5 or G5, i.e. in one of the states corresponding to two simultaneous normal transmissions, logic SCUBRD enters one out of states B5, C5, D5, E5, namely the one allowing the transmission still in progress to end regularly. That state will be the one in which signal SWSET keeps the same value and signal START relevant to the output port still active is kept 1.

Figure 11:
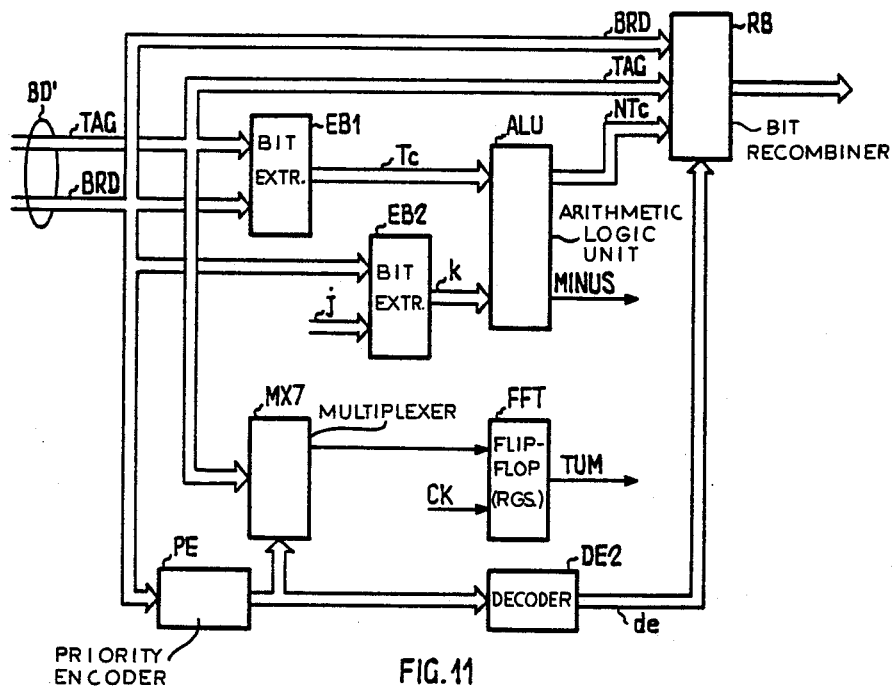
FIG. 11 is a block diagram of the routing tag processing circuit in the switch control unit.

FIG. 11 shows the structure of the routing tag processor block MANET. It comprises a priority encoder PE, two bit extractors EB1, EB2, a bit recombining device RB, a logic-arithmetic unit ALU, a multiplexer MX7 with n inputs (n=bit number in each of the tag portions, e.g. 4) and one output, a register FFT storing bit TUM to be sent to logic SCUBRD, and an n-output decoder DE2.

Priority encoder PE analyzes broadcast transmission tag BRD and generates a binary number coding the position occupied in BRD by the most significant bit with logic value 1 (bit BUM). The coded value is sent to multiplexer MX4 as a control signal to select the corresponding bit TUM of the normal transmission tag and to send said bit to register FFT, where it is kept available for logic SCUBRD, and to decoder DE2, which emits a bit pattern de in which only one bit has a predetermined logic value. The position of said bit in the pattern identifies the position of bit BUM. For reasons depending on the structure described here for the recombining device, the logic value of the identificative bit is supposed to be 0.

Bit extractor EB1 is to extract from normal transmission tag TAG bits TUM, TU(M−1) ... TU(1), and to force bit TUM to 1 and shift it to the right (towards the less significant positions) together with bits TU(M−1) . . . TU1, to form number Tc. Besides, EB1 re-emits the bits of TAG which will be used in RB. Forcing TUM to 1 is necessary to allow correct operation of unit ALU. The structure of bit extractor EB1 will be examined in detail with reference to FIG. 12.

Bit extractor EB2 receives the bits of the broadcast transmission tag and the signal coding number j of the stage and generates number k as is examined in the description of the broadcast algorithm.

Block ALU executes subtraction $Tc-2^k$ and emits a new bit pattern NTc, representing the subtraction result, and signal MINUS which is supplied to logic SCUBRD which, as said, uses it to decide whether to begin or not a broadcast transmission cycle.

Bit recombining device RB receives the bits of normal transmission tag TAG, bits NTc and the bits emitted by decoder DE2 and, if necessary, substitutes the bits of NTc for those of Tc, letting bit TUM unchanged. The bits emitted by decoder DE2 are the information necessary to let bit TUM to be transmitted unchanged.

Figure 12:
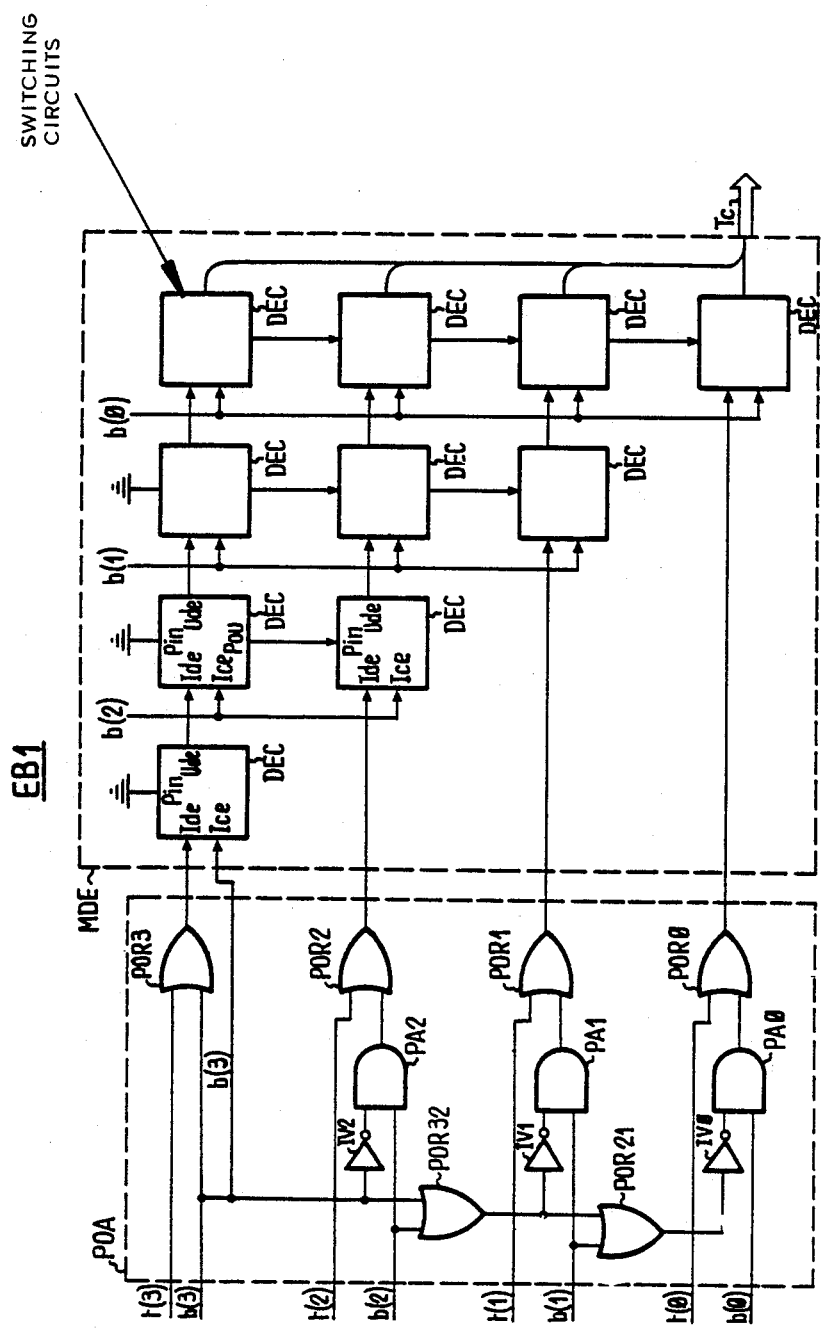

With reference to FIG. 12, bit extractor EB1, here disclosed by way of example for the case in which TAG and BRD comprise 4 bits each, comprises a triangular matrix MDE of switching circuits DEC, preceded by a group POA of OR-AND-OR gates. This group serves to identify the position occupied by bit TUM and to set such a bit to 1 for the construction of number Tc. To this end bits $t(3) \ldots T(0)$ of TAG are supplied each to an input of a respective OR gate POR3...POR0. Gate gate POR3 receives at a second input bit $b(3)$ of BRD, while gates POR2...POR0 receive a respective bit $b(2) \ldots b(0)$ of BRD through respective AND gate PA2...PA0, enabled through a respective inverter IV2..IV0 if none of the more significant bits b is 1. The latter information is supplied by cascaded OR gates POR32 and POR21.

Matrix MDE of circuits DEC is controlled by bits $b(i)$, extracts from bits $t(i)$ the bits designed to form number Tc, and emits them compacted towards the least significant bits.

A matrix similar to MDE forms extractor EB2. Here the gate group is not necessary, as forcing the most significant bit to 1 is not required.

Each element DEC has two data inputs (Ide, Pin), two data outputs (Ude, Pou) and a control input (Ice), at which it receives the suitable bit of BRD, which is the same for all circuits in a column. Data input Ide is connected to output Udb of the preceding circuit (with reference to the direction input-output of EB1) in the same row of MDE or to the output of a respective OR gate POR3...POR0, in case of the first circuit in a row; data input Pin is connected to output Pou of the circuit in the preceding row of the same column, or to logic value 0 (ground) in case of the first row.

Figure 13:
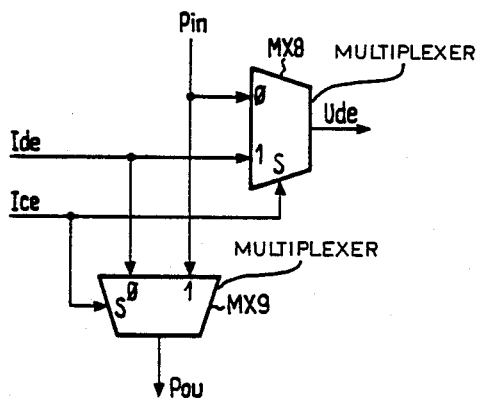
FIGS. 12 to 15, are detailed block diagrams of some of the circuits of the routing tag processing circuit of FIG. 11.
Figure 15:
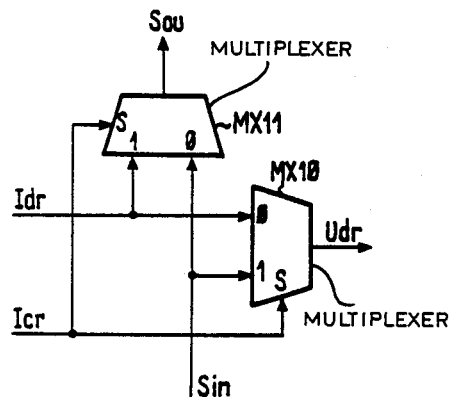

As shown in FIG. 13, circuits DEC each consist of two multiplexers MX8, MX9 with two inputs and one output, both controlled by the same bit $b(i)$. For instance when bit $b(i)$ is 1, input 1 of MX8, MX9 is connected to the output and vice versa. The outputs of MX8, MX9 form respectively outputs Ude, Pou of the circuit. Their select inputs S are both connected to Ice, and the data inputs are connected to Pin and Ide, yet in an inverted way. For instance Pin is connected to input 0 of MX8 and input 1 of MX9, and vice versa for Ide. Thus, for a given value of the select bit, the two multiplexers connect different inputs to their outputs.

The operation of circuit DEC can be deduced from FIG. 13. Depending on the value of control input Ice, where the suitable bit of BRD is present, the circuit performs either a downward shift or a propagation along the same row. More particularly, if Ice=0 the signal present on input Ide propagates to output Pou and the logic 0 present on input Pin propagates to output Ude. If Ice=1, input Ide propagates to output Ude and input Pin propagates to output Pou, the latter being not used. It can then immediately be noted that matrix MDE performs a downward shift whenever a bit $b(i)$ is 0, so that the bits of Tc are actually compacted at its output.

Figure 14:
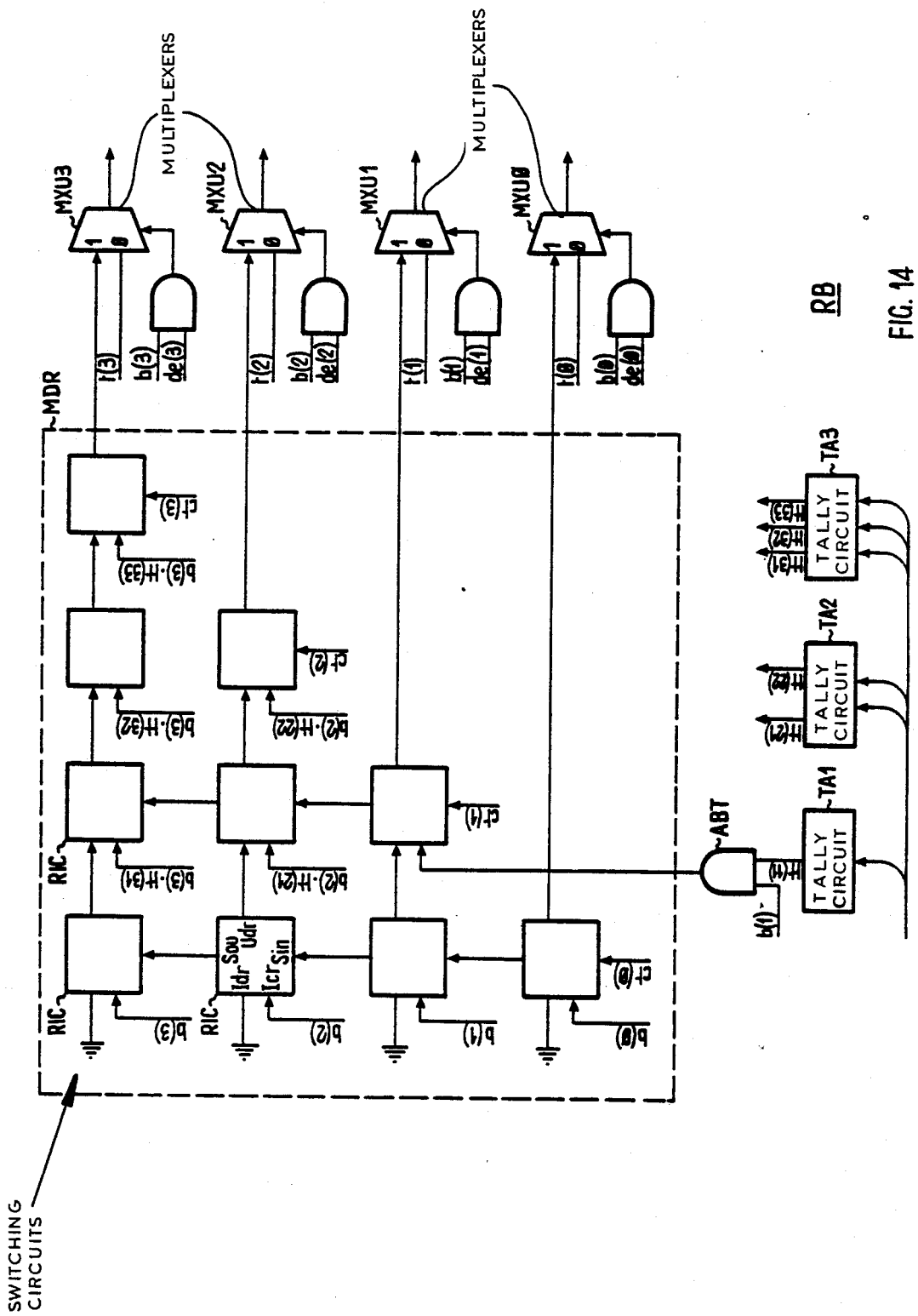

With reference to FIG. 14, recombining device RB comprises, still considering the case of 4 bits for each tag portion:

a triangular matrix MDR with 4 rows and 4 columns of switching circuits RIC which carry out, on bits $ct(i)$ of NTc, a dual operation with respect to that performed by switching elements DEC of matrix MDE on the bits of TAG;

a bank of three elements TA1, TA2, TA3 implementing the TALLY operation on the three possible subpatterns of bit on bus BRD, a first subpattern containing the least significant bit and the other two being obtained by adding at the left the bit or respectively the two bits of immediately higher weight. The TALLY function, as known, counts the number of bits at 1 present in a bit pattern, and expresses said number in a completely decoded way. The structure of a circuit carrying out such a function is described e.g. in the already-cited book by Mead and Conway, pages 78 ff. The outputs of said blocks TA, duly combined one by one with the bits of BRD in AND gates, are sent as control signals to elements RIC of MDR. Only the AND gate associated with TA1 is shown and is denoted ABT. The outputs of TA are indicated by $tt(11) \ldots tt(33)$: the first number indicates the size of the subpattern on which the TALLY function has been applied and is coincident with the row index of matrix MDR, while the second number indicates the number of bits at 1 found out in the subpattern analyzed and is coincident with the column index of matrix MDR. The output indicating that all bits are 0 (which ought to be supplied to elements RIC of the first column of MDR) is not used, since said information is unnecessary to correctly locate bit $ct(0)$: this one can simply move upwards along the first matrix column and then propagate along the proper row in block RIC controlled by the first bit at 1 in BRD; and a bank of 4 multiplexers MXUB...MXUO with two inputs and one output; each multiplexer MXU(i) has an input connected to the output of a row of MDR, receives at the other input bit $t(i)$ and, on the basis of the value of the logic AND between bit $b(i)$ and the corresponding output $de(i)$ of decoder DE2 (FIG. 11), emits as new bit of TAG either the signal present at the output of the relevant row of matrix MDR or old bit $t(i)$.

Each circuit RIC (FIG. 15) has two data inputs Idr, Sin, two outputs Udr, Sou and a control input Icr. Data input Idr is connected with output Udr of the preceding block (with reference to the direction input-output of RB) in the same row of MDE or to ground, in case of the first column. Data input Sin is connected to output Sou of the circuit placed in the row below in the same column, or it receives one of the bits $ct$ of NTc. The control signals of individual elements RIC are obtained, as said, as logic AND between bits $b(i)$ of BRD and the results of TALLY functions, except for the first column, whose circuits are directly controlled by bits $b(i)$.

Each element RIC consists (FIG. 15) of two multiplexers MX10, MX11 with two inputs and one output. The outputs of MX10, MX11 form outputs Udr, Sou of the element. The inputs of both multiplexers are connected to Idr and Sin, also in this case with a complementary connection. More particularly, if the bit present at control input is 0 the connection between Sin and Sou and between Idr and Udr is set up, while if the control bit is 1 the connections between Idr and Sou and between Sin and Udr are established.

By this arrangement the least significant bit ct(0) of NTc propagates towards MXUD if b(0) is 1. Otherwise, the least significant bit is shifted upwards along the first column of the matrix up to the row corresponding to the first bit b at 1, and then it follows a horizontal trajectory in the matrix up to the input of output multiplexer MXU of that row. The second bit ct(1) propagates horizontally if b(1) and tt(11) are 1 (and hence if also b(0) was (1). Otherwise the second bit is shifted upwards up to the row corresponding to the second bit b at 1 and then it propagates horizontally, and so on for the following bits of NTc, until there are no longer bits at 1 in BRD. It is evident under these conditions that function of the output signals of each of the blocks of TA is to signal how many preceding bits in BRD are 1. In multiplexers MXU bits ct(i) supplied by MDR replace the bits of TAG corresponding to bits b(i) at 1, with the only exception of the one corresponding to TUM. In fact, supposing that bit de(i) corresponding to BUM is 0, the control bit of the multiplexer in the corresponding row in RB is 0 and hence TUM is let through unchanged. The same holds for all the rows for which bit b is at 0.

It is clear that what described has been given only by way of non-limiting example and which, by modifications which are within the normal ability of the skilled in art, the invention can be applied to networks of different type or to elements having a different number of inputs and outputs.

APPENDIX 1

The appendix contains the SCUBRD program ASMA language. For the sake of program understanding, the following remarks are made:

the terms contained in paragraph "MACRO" identify the logical expressions determining state transitions. In those expressions, symbol "!" denotes the NOT function, "&" the AND function, "|" the OR function;

the operations carried out in a given state are identified by the state name followed by ""; the end of such operations is denoted by ""; for the states with several transition possibilities also labels "CASE", "ENDCASE" are provided, after ""and before "", respectively, and the logic expression, the active outputs and the next state (GOTO . . . ) are given for each transition; active outputs common to all transitions of a state are listed outside the CASE; for the states with only one transition possibility only the list of the active outputs and the next state are given;

symbol "#" indicates comments concerning the state.

It is to be appreciated that the inputs/outputs are written here in small letters, whereas they are shown in capital letters in the drawings.

---

SCUBRD

| | |
|---|---|
| INPUTS: | fnva, taga, brda, tuma, fnvb, tagb, brdb, tumb, minusa, minusb, fcscu0: fcscu1, defoisa, defoisb, ffpr; |
| OUTPUTS: | swset, start0, start1, toggle, tobra, tobrb, enrega, enregb, abmoda, abmodb; |
| STATES: | A5 (WAIT), B5, C5, D5, E5, F5, G5, brfroma, brfromb, verso_B5, verso_C5, verso_D5, verso_E5, verso_G5, verso_F5; |
| MACRO: | nopa := !fnva&!defoisa, |
| | nopawa := !fnva, |
| | trua := fnva&!taga&!brda&!defoisa, |
| | truawa := fnva&!taga&!brda, |
| | trda := fnva&taga&!brda&!defoisa, |
| | trdawa := fnva&taga&!brda, |

---

SCUBRD —continued

| | |
|---|---|
| | brawa := fnva&brda: |
| | primobra := brda&fnva&!defoisa, |
| | seconbra := defoisa, |
| | nopb := !fnvb&!defoisb, |
| | nopbwa := !fnvb, |
| | trub := fnvb&!tagb&!brdb&!defoisb, |
| | trubwa := fnvb&!tagb&!brdb, |
| | trdb := fnvb&tagb&!brdb&!defoisb, |
| | trdbwa := fnvb&tagb&!brdb, |
| | brbwa := fnvb&brdb, |
| | primobrb := brdb&fnvb&!defoisb, |
| | seconbrb := defoisb; |

WAIT
CASE
truawa&trubwa&ffpr:
    swset := 1;
    start0 := 1;
    toggle := 1;
    GOTO B5;

nopawa&trubwa:
    swset := 1;
    start0 := 1;
    GOTO B5;

trdawa&trdbwa&ffpr:
    start1 := 1;
    toggle := 1;
    GOTO C5;

nopawa&trdbwa:
    start1 := 1;
    GOTO C5;

truawa&trdbwa:
    start0 := 1;
    start1 := 1;
    GOTO G5;

trdawa&trubwa:
    swset := 1;
    start0 := 1;
    start1 := 1;
    GOTO F5;

truawa&nopbwa:
    start0 := 1;
    GOTO E5;

truawa&trubwa&!ffpr:
    start0 := 1;
    toggle := 1;
    GOTO E5;

trdawa&trdbwa&!ffpr:
    swset := 1;
    start1 := 1;
    toggle := 1;
    GOTO D5;

trdawa&nopbwa:
    swset := 1;
    start1 := 1;
    GOTO D5;

nopawa&nopbwa:
    GOTO wait;

brawa&!brbwa:
    enrega := 1;
    GOTO brfroma;

brawa&brbwa&ffpr:
    enrega := 1;
    GOTO brfroma;

brawa&brbwa&!ffpr:
    enregb := 1;
    GOTO brfromb;

brbwa&!brawa:
    enregb := 1;
    GOTO brfromb;

ENDCASE
B5 # fif b transmits over channel 0;
    swset := 1
CASE
trua&trub&fcscu0&!ffpr:
    start0 := 1;
    toggle := 1;
    GOTO E5;

trua&nopb&fcscu0:
    start0 := 1;
    GOTO E5;

trda&trdb&fcscu0&ffpr:
    start1 := 1;

SCUBRD

```
nopa&trdb&fcscu0:
                                    toggle := 1;
                                    GOTO C5;

trua&trdb&fcscu0:
                                    start1 := 1;
                                    GOTO C5;

trda&!fcscu0 |
trda&trub&fcscu0:
                                    start0 := 1;
                                    start1 := 1;
                                    GOTO G5;

nopa&nopb&fcscu0:
                                    swset := 1;
                                    start0 := 1;
                                    start1 := 1;
                                    GOTO F5;

trda&trdb&fcscu0&!ffpr:
                                    GOTO wait;

trda&nopb&fcscu0:
                                    swset := 1;
                                    start1 := 1;
                                    toggle := 1;
                                    GOTO D5;

trua&!fcscu0&ffpr |
trua&trub&fcscu0&ffpr:
                                    swset := 1;
                                    start1 := 1;
                                    GOTO D5;

trua&!fcscu0&!ffpr |
seconbra&!fcscu0 |
nopa&!fcscu0 |
nopa&trub&fcscu0:
                                    swset := 1;
                                    start0 := 1;
                                    toggle := 1;
                                    GOTO B5;

primobra&fcscu0&!seconbrb:
                                    swset := 1;
                                    start0 := 1;
                                    GOTO B5;

primobra&fcscu0&seconbrb:
                                    enrega := 1;
                                    GOTO brfroma;

primobra&!fcscu0:
                                    tobrb := 1;
                                    swset := 0;
                                    GOTO verso_C5;

seconbra&fcscu0&(nopb
trub):
                                    swset := 1;
                                    start0 := 1;
                                    GOTO B5;

seconbra&fcscu0&trdb:
                                    tobra := 1;
                                    GOTO verso_E5;

seconbra&fcscu0&primobrb:
                                    tobra := 1;
                                    swset := 0;
                                    start1 := 1;
                                    GOTO verso_G5;

seconbra&fcscu0&seconbrb:
                                    tobra := 1;
                                    swset := 0;
                                    GOTO verso_E5;

primobrb&fcscu0&!primobra:
                                    tobra := 1;
                                    tobrb := 1;
                                    GOTO verso_G5;

seconbrb&fcscu0&(nopa
trda):
                                    enregb := 1;
                                    GOTO brfromb;

seconbrb&fcscu0&trua:
                                    tobrb := 1;
                                    GOTO verso_C5;

tobrb := 1;
                                    swset := 0;
                                    start0 := 1;
                                    GOTO verso_G5;
ENDCASE
C5 # fif_b transmits over channel 1;       swset := 0
```

SCUBRD

```
CASE
trua&trub&fcscu1&ffpr:
                                    swset := 1;
                                    start0 := 1;
                                    toggle := 1;
                                    GOTO B5;

nopa&trub&fcscu1:
                                    swset := 1;
                                    start0 := 1;
                                    GOTO B5;

trua&trub&fcscu1&!ffpr:
                                    start0 := 1;
                                    toggle := 1;
                                    GOTO E5;

trua&nopb&fcscu1:
                                    start0 := 1;
                                    GOTO E5;

trua&!fcscu1 |
trua&trdb&fcscu1:
                                    start0 := 1;
                                    start1 := 1;
                                    GOTO G5;

trda&trub&fcscu1:
                                    swset := 1;
                                    start0 := 1;
                                    start1 := 1;
                                    GOTO F5;

trda&trdb&fcscu1&!ffpr:
                                    swset := 1;
                                    start1 := 1;
                                    toggle := 1;
                                    GOTO D5;

trda&nopb&fcscu1:
                                    swset := 1;
                                    start1 := 1;
                                    GOTO D5;

nopa&nopb&fcscu1;
                                    GOTO wait;

trda&!fcscu1&ffpr |
trda&trdb&fcscu1&ffpr:
                                    start1 := 1;
                                    toggle := 1;
                                    GOTO C5;

seconbra!fcscu1 |
trda&!fcscu1&!ffpr |
nopa&!fcscu1 |
nopa&trdb&fcscu1:
                                    start1 := 1;
                                    GOTO C5;

primobra&fcscu1&!seconbrb:
                                    enrega := 1;
                                    GOTO brfroma;

primobrb&fcscu1&!primobra:
                                    enregb := 1;
                                    GOTO brfromb;

# end of portion common to all states and
with outputs independent of the present state

primobra&fcscu1&seconbrb:
                                    tobrb := 1;
                                    swset := 1;
                                    GOTO verso_B5;

primobra&!fcscu1:
                                    swset := 0;
                                    start1 := 1;
                                    GOTO C5;

seconbra&fcscu1&(nopb
trdb):
                                    tobra := 1;
                                    GOTO verso_D5;

seconbra&fcscu1&trub:
                                    tobra := 1;
                                    swset := 1;
                                    start0 := 1;
                                    GOTO verso_F5;

seconbra&fcscu1&primobrb:
                                    tobra := 1;
                                    swset := 1;
                                    GOTO verso_D5;

seconbra&fcscu1&seconbrb:
```

SCUBRD

```
                                    tobra := 1;
                                    tobrb := 1;
                                    GOTO verso__F5;
seconbrb&fcscu1&(nopa
trua):

seconbrb&fcscu1&trda:
                                    tobrb := 1;
                                    GOTO verso__B5;

tobrb := 1;
                                    swset := 1;
                                    start1 := 1;
                                    GOTO verso__F5;
ENDCASE
D5 # fif__a transmits over channel 1;
CASE
trua&trub&fcscu1&!ffpr:
                                    start0 := 1;
                                    toggle := 1;
                                    GOTO E5;
trua&nopb&fcscu1:
                                    start0 := 1;
                                    GOTO E5;
trua&trdb&fcscu1:
                                    start0 := 1;
                                    start1 := 1;
                                    GOTO G5;
trub&!fcscu1 |
trda&trub&fcscu1:
                                    swset := 1;
                                    start0 := 1;
                                    start1 := 1;
                                    GOTO F5;
nopa&nopb&fcscu1:
                                    GOTO wait;
trua&trub&fcscu1&ffpr:
                                    swset := 1;
                                    start0 := 1;
                                    toggle := 1;
                                    GOTO B5;
nopa&trub&fcscu1:
                                    swset := 1;
                                    start0 := 1;
                                    GOTO B5;
nopa&trdb&fcscu1:
                                    start1 := 1;
                                    GOTO C5;
trda&trdb&fcscu1&ffpr:
                                    start1 := 1;
                                    toggle := 1;
                                    GOTO C5;
trdb&!fcscu1&!ffpr |
trda&trdb&fcscu1&!ffpr:
                                    swset := 1;
                                    start1 := 1;
                                    toggle := 1;
                                    GOTO D5;
trdb&!fcscu1&ffpr |
seconbrb&!fcscu1 |
nopb&!fcscu1 |
trda&nopb&fcscu1:
                                    swset := 1;
                                    start1 := 1;
                                    GOTO D5;
primobra&fcscu1&!primobrb:
                                    enrega := 1;
                                    GOTO brfroma;
primobrb&fcscu1&!seconbra:
                                    enregb := 1;
                                    GOTO brfromb;

# end of portion common to all states and
with outputs independent of the present state

primobra&fcscu1&seconbrb:
                                    tobrb := 1;
                                    swset := 0;
                                    GOTO verso__B5;
primobrb&!fcscu1:
                                    swset := 1;
                                    start1 := 1;
                                    GOTO D5;
```

SCUBRD

```
seconbra&fcscu1&(nopb
trub):
                                    tobra := 1;
                                    GOTO verso__E5;
seconbra&fcscu1&trdb:
                                    tobra := 1;
                                    swset := 0;
                                    start1 := 1;
                                    GOTO verso__G5;
seconbra&fcscu1&primobrb:
                                    tobra := 1;
                                    swset := 0;
                                    GOTO verso__D5;
seconbra&fcscu1&seconbrb:
                                    tobra := 1;
                                    tobrb := 1;
                                    GOTO verso__G5;
seconbrb&fcscu1&(nopa
trda):
                                    tobrb := 1;
                                    GOTO verso__C5;
seconbrb&fcscu1&trua:
                                    tobrb := 1;
                                    swset := 0;
                                    start0 := 1;
                                    GOTO verso__G5;
ENDCASE
E5 # fif__a transmits over channel 0;
CASE
trua&trub&fcscu0&ffpr:
                                    swset := 0 swset := 1;
                                    start0 := 1;
                                    toggle := 1;
                                    GOTO B5;
nopa&trub&fcscu0:
                                    swset := 1;
                                    start0 := 1;
                                    GOTO B5;
trda&trub&fcscu0:
                                    swset := 1;
                                    start0 := 1;
                                    start1 := 1;
                                    GOTO F5;
trda&trdb&fcscu0&ffpr:
                                    start1 := 1;
                                    toggle := 1;
                                    GOTO C5;
nopa&trdb&fcscu0:
                                    start1 := 1;
                                    GOTO C5;
trdb&!fcscu0 |
trua&trdb&fcscu0:
                                    start0 := 1;
                                    start1 := 1;
                                    GOTO G5;
trda&trdb&fcscu0&!ffpr:
                                    swset := 1;
                                    start1 := 1;
                                    toggle := 1;
                                    GOTO D5;
trda&nopb&fcscu0:
                                    swset := 1;
                                    start1 := 1;
                                    GOTO D5;
nopa&nopb&fcscu0:
                                    GOTO wait;
trub&!fcscu0&!ffpr |
trua&trub&fcscu0&!ffpr:
                                    start0 := 1;
                                    toggle := 1;
                                    GOTO E5;
trub&!fcscu0&ffpr |
seconbrb&!fcscu0 |
nopb&!fcscu0 |
trua&nopb&fcscu0:
                                    start0 := 1;
                                    GOTO E5;
primobra&fcscu0&!primobrb:
                                    enrega := 1;
                                    GOTO brfroma;
primobrb&fcscu0&!seconbra:
```

SCUBRD

```

end of portion common to all states and
with outputs independent of the present state

primobra&fcscu0&seconbrb:
                                    tobrb := 1;
                                    swset := 1;
                                    GOTO verso__B5;
primobrb&!fcscu0:
                                    swset := 0;
                                    start0 := 1;
                                    GOTO verso E5;
seconbra&fcscu0&(nopb
 trdb):
                                    tobra := 1;
                                    GOTO verso__D5;
seconbra&fcscu0&trub:
                                    tobra := 1;
                                    swset := 1;
                                    start0 := 1;
                                    GOTO verso__F5;
seconbra&fcscu0&primobrb:
                                    tobra := 1;
                                    swset := 1;
                                    GOTO verso__E5;
seconbra&fcscu0&seconbrb:
                                    tobra := 1;
                                    tobrb := 1;
                                    GOTO verso__F5;
seconbrb&fcscu0&(nopa
 trua):
                                    tobrb := 1;
                                    GOTO verso__B5;
seconbrb&fcscu0&trda:
                                    tobrb := 1;
                                    swset := 1;
                                    start1 := 1;
                                    GOTO verso__F5;
ENDCASE
F5 # fif__a transmits over channel 1,
 fif b__ over channel 0;
CASE
trua&!fcscu0&fcscu1&ffpr |
trua&trub&fcscu0&fcscu1&ffpr:
                                    swset := 1
                                    swset := 1;
                                    start0 := 1;
                                    toggle := 1;
                                    GOTO B5;
trua&!fcscu0&fcscu1&!ffpr |
seconbra&!fcscu0&fcscu1 |
nopa&!fcscu0&fcscu1 |
nopa&trub&fcscu0&fcscu1:
                                    swset := 1;
                                    start0 := 1;
                                    GOTO B5;
trda&trdb&fcscu0&fcscu1&ffpr:
                                    start1 := 1;
                                    toggle := 1;
                                    GOTO C5;
nopa&trdb&fcscu0&fcscu1:
                                    start1 := 1;
                                    GOTO C5;
trua&trub&fcscu0&fcscu1&!ffpr:
                                    start0 := 1;
                                    toggle := 1;
                                    GOTO E5;
trua&nopb&fcscu0&fcscu1:
                                    start0 := 1;
                                    GOTO E5;
trdb&fcscu0&!fcscu1&!ffpr |
trda&trdb&fcscu0&fcscu1&!ffpr:
                                    swset := 1;
                                    start1 := 1;
                                    toggle := 1;
                                    GOTO D5;
trdb&fcscu0&!fcscu1&ffpr |
seconbrb&fcscu0&!fcscu1 |
nopb&fcscu0&!fcscu1 |
trda&nopb&fcscu0&fcscu1:
                                    enregb := 1;
                                    GOTO brfromb;
nopa&nopb&fcscu0&fcscu1:
trua&trdb&fcscu0&fcscu1:
!fcscu0&!fcscu1 |
trda&!fcscu0&fcscu1 |
trub&fcscu0&!fcscu1 |
trda&trub&fcscu0fcscu1:
primobra&fcscu0&fcscu1&!
 (seconbrb
 primobrb):
primobra&fcscu0&fcscu1&primobrb&ffpr:
primobra&fcscu0&fcscu1&primobrb&!ffpr:
primobrb&fcscu0&fcscu1&!
 seconbra
 primobra):

# end of portion common to all states and
with outputs independent of the present state

primobra&fcscu0&fcscu1&seconbrb:
primobra&!fcscu0&fcscu1;
primobrb&fcscu0&!fcscu1;
seconbra&fcscu0&fcscu1&(nopb
 trub):
seconbra&fcscu0&fcscu1&trdb:
seconbra&fcscu0&fcscu1&primorb:
seconbra&fcscu0&fcscu1&seconbrb:
seconbra&fcscu0&fcscu1&(nopa
 trda):
seconbrb&fcscu0&fcscu1&trua:
ENDCASE
G5; # fif__a transmits over channel 0,
 fif__b over channel 1;
CASE
trda&trub&fcscu0&fcscu1;
```

SCUBRD

```
                                    swset := 1;
                                    start1 := 1;
                                    GOTO D5;
                                    GOTO wait;
                                    start0 := 1;
                                    start1 := 1;
                                    GOTO G5;
                                    swset := 1;
                                    start0 := 1;
                                    start1 := 1;
                                    GOTO F5;
                                    enrega := 1;
                                    GOTO brfroma;
                                    enrega := 1;
                                    GOTO brfroma;
                                    enregb := 1;
                                    GOTO brfromb;
                                    enregb := 1;
                                    GOTO brfromb;
                                    tobrb := 1;
                                    GOTO verso__C5;
                                    swset := 1;
                                    start0 := 1;
                                    GOTO B5;
                                    swset := 1;
                                    start1 := 1;
                                    GOTO D5;
                                    tobra := 1;
                                    GOTO verso__E5;
                                    tobra := 1;
                                    swset := 0;
                                    start1 := 1;
                                    GOTO verso__G5;
                                    tobra := 1;
                                    swset := 0;
                                    GOTO verso__E5;
                                    tobra := 1;
                                    tobrb := 1;
                                    GOTO verso__G5;
                                    tobrb := 1;
                                    GOTO verso__C5;
                                    tobrb := 1;
                                    swset := 0;
                                    start0 := 1;
                                    GOTO verso__G5;
                                    swset := 0
                                    swset := 1;
                                    start0 := 1;
```

SCUBRD trua&trubfcscu0&fcscu1&ffpr:
```
                    start1 := 1;
                    GOTO F5;
``` nopa&trub&fcscu0&fcsou1;
```
                    swset := 1;
                    start0 := 1;
                    toggle := 1;
                    GOTO B5;
``` trda&fcscu0&!fcscu1&ffpr |
trda&trdb&fcscu0&fcscu1&ffpr:
```
                    swset := 1;
                    start0 := 1;
                    GOTO B5;
``` trda&fcscu0&!fcscu1&!ffpr |
seconbra&fcscu0&!fcscu1 |
nopa&fcscu0&!fcscu1 |
nopa&trdb&fcscu0&fcscu1;
```
                    start1 := 1;
                    toggle := 1;
                    GOTO C5;
``` trda&trdb&fcscu0&fcscu1&!ffpr:
```
                    start1 := 1;
                    GOTO C5;
``` trda&nopb&fcscu0&fcscu1;
```
                    swset := 1;
                    start1 := 1;
                    toggle := 1;
                    GOTO D5;
``` trub&!fcscu0&!fcscu1&!ffpr |
trua&trub&fcscu0&fcscu1&!ffpr:
```
                    swset := 1;
                    start1 := 1;
                    GOTO D5;
``` trub&!fcscu0&!fcscu1&ffpr |
seconbrb&!fcscu0&!fcscu1 |
nopb&!fcscu0&!fcscu1 |
trua&nopb&fcscu0&fcscu1;
```
                    start0 := 1;
                    toggle := 1;
                    GOTO E5;
``` nopa&nopb&fcscu0&Fcscu1;
```
                    start0 := 1;
                    GOTO E5;
```

!fcscu0&!fcscu1 |
trua&fcscu0&!fcscu1 |
trdb&!fcscu0&fcscu1 |
trua&trdb&fcscu0&fcscu1;
```
                    GOTO wait;
``` primobra&fcscu0&fcscu1&!
seconbrb
primobrb):
```
                    start0 := 1;
                    start1 := 1;
                    GOTO G5;
``` primobra&fcscu0&fcscu1&primobrb&ffpr:
```
                    enrega := 1;
                    GOTO brfroma;
``` primobra&fcscu0&fcscu1&primobrb&!ffpr:
```
                    enrega := 1;
                    GOTO brfroma;
``` primobrb&fcscu0&fcscu1&!
(seconbra
primobra):
```
                    enregb := 1;
                    GOTO brfromb;
``` end of portion common to all states and
with outputs independent of the present state

primobra&fcscu0&fcscu1&seconbrb:
```
                    enregb := 1;
                    GOTO brfromb;
```

```
                    tobrb := 1;
                    swset := 1;
                    GOTO verso__B5;
``` primobra&fcscu0&!fcscu1:
```
                    swset := 0;
                    start1 := 1;
                    GOTO C5;
``` primobrb&!fcscu0&fcscu1:
```
                    swset := 0;
```

SCUBRD seconbra&fcscu0&fcscu1&(nopb trdb):

seconbra&fcscu0&fcscu1&trub:

seconbra&fcscu0&fcscu1&primobrb:

seconbra&fcscu0&fcscu1&seconbrb:

seconbrb&fcscu0&fcscu1&(nopa trua):

seconbrbfcscu0&fcscu1&trda:

ENDCASE
brfroma
CASE
!minusa&tuma:

!minusa&!tuma:

minusa&tuma:

minusa&!tuma:

ENDCASE
brfromb
CASE
!minusb&tumb:

!minusb&!tumb:

minusb&tumb:

minusb&!tumb:

ENDCASE
verso__B5 verso__C5 verso__D5 verso__E5 verso__F5

```
                    start0 := 1;
                    GOTO E5;
```

```
                    tobra := 1;
                    GOTO verso__D5;
```

```
                    tobra := 1;
                    swset := 1;
                    start0 := 1;
                    GOTO verso__F5;
```

```
                    tobra := 1;
                    swset := 1;
                    GOTO verso__D5;
```

```
                    tobra := 1;
                    tobrb := 1;
                    GOTO verso__F5;
```

```
                    tobrb := 1;
                    GOTO verso__B5;
```

```
                    tobrb := 1;
                    swset := 1;
                    start1 := 1;
                    GOTO verso__F5;
```

```
                    abmoda := 1;
```

```
                    tobra := 1;
                    GOTO verso__D5;
```

```
                    tobra := 1;
                    GOTO verso__E5;
```

```
                    GOTO verso__D5;
```

```
                    GOTO verso__E5;
```

```
                    abmodb := 1;
```

```
                    tobrb := 1;
                    GOTO verso__B5;
```

```
                    tobrb := 1;
                    GOTO verso__C5;
```

```
                    GOTO verso__B5;
```

```
                    GOTO verso__C5;
```

```
                    start0 := 1;
                    start1 := 0;
                    swset := 1;
                    GOTO__B5;
```

```
                    start0 := 0;
                    start1 := 1;
                    swset := 0;
                    GOTO C5;
```

```
                    start0 := 0;
                    start1 := 1;
                    swset := 1;
                    GOTO D5;
```

```
                    start0 := 1;
                    start1 := 0;
                    swset := 0;
                    GOTO E5;
```

```
                    start0 := 1;
                    start1 := 1;
                    swset := 1;
                    GOTO F5;
                    start0 := 1;
```

```
                            -continued
                              SCUBRD
                                                    start1 := 1;
                                                    swset := 0;
                                                    GOTO G5;
ENDSCUBRD
```

We claim:

1. A packet-switching element for a selfrouting multistage interconnection network comprising a multiplicity of said elements in respective stages of said network and allowing broadcasting of packets forwarded through the network, each of said elements comprising:

a plurality of element inputs (IDA, IDB) and a plurality of element outputs (UD0, UD1);

an input unit composed of the same number of sections as there are said element inputs for the respective element and having for each of said sections a respective FIFO memory (FIFA, FIFB) for packet buffering before forwarding a packet received at the respective element input toward at least one of said element outputs;

a switch (SW) having a switch control unit (SCU) between said input unit and said element outputs for establishing a connection between one of said element inputs (IDA, IDB) and at least one of said element outputs (UD0, UD1) as determined by information contained in a routing tag associated with each packet and having a first routing tag portion (TAG) and a second routing tag portion (BRD) signalling a normal nonbroadcast routing and broadcasting to different one of said network stages, respectively, and including means for solving possible routing conflicts between packets simultaneously arriving at different element inputs; and an output unit (RU0, RU1) having as many sections as there are element outputs and each provided with a respective one of said element outputs and being connected to said switch (SW), said switch control unit (SCU) comprising: broadcasting-request-responsive means (SCUBRD, MANET) for detecting a broadcasting request carried by a respective packet for:

evaluating a possibility of accepting a broadcast request carried by a respective packet by comparing a first parameter representing a number of destination ones of said elements to which the respective packet is to be broadcast with a second parameter representing a position of the stage to which the respective element belongs among all stages where broadcasting is requested and indicating a maximum number of outputs of said network which may be potentially seized for broadcasting of a particular message, accepting said broadcasting request if said first parameter is greater than or equal to said second parameter, generating, if said request is accepted, a signal (DEFOISA, DEFOISB) for communicating an accepted-request condition to the memory (FIFA, FIFB) storing the packet to be broadcast, and generating at least one modified routing tag for the packet to be broadcast and sending the modified routing tag over a respective one of said element outputs selected for broadcasting, the broadcasting request being processed in one of said elements in a respective one of said stages independently of the processing of other broadcasting requests in others of said elements in the same stage; and each of said memories (FIFA, FIFB) being provided with means (CTD, CT) responsive to said signal (DEFOISA, DEFOISB) for communicating an accepted-request condition to the memory (FIFA, FIFB) storing the packet to be broadcast and generated by the switch control unit (SCU) of the switch (SW), for effecting actual broadcasting of the respective packet by a plurality of successive readings of the same packet.

2. The element defined in claim 1 wherein the element has two element inputs and two element output said first parameter (Tc) is a binary number obtained by extracting from said first tag portion (TAG) bits relevant to the stages wherein broadcasting is requested, by compacting such bits towards the least significant positions, and by forcing a most significant bit (TUM) to 1, and said second parameter is given by $2^k$, k being the serial number of the stage to which the element belongs in the sequence of stages wherein broadcasting is requested.

3. The element defined in claim 2 wherein the means that in the memories (FIFA, FIFB) of the input unit (IMA, IMB) allow a plurality of consecutive readings of a same packet for broadcast transmission comprise a pair of reading address counters (CTD, CT), incremented by the same advance signal (INCRD), the first counter (CTD) loading the count of the second counter (CT) in correspondence with the arrival of signal (DEFOIS) emitted by the switch control unit (SCU) to indicate that the reading to be carried out is the first of the broadcast transmission, while the second counter remains disabled as long as such a signal is present, the outputs of the two counters being connected to the two inputs of a multiplexer (MX3) letting through, as reading address, the count of the first counter (CTD) or of the second (CT) in the presence or absence, respectively, of said signal (DEFOIS) emitted by the control unit (SCU) of the switch (SW).

4. The element defined in claim 1 wherein said modified tag is obtained by replacing, in the first tag portion, bits used for forming first parameter, with the exception of the most significant bit, by bits of the result of a subtraction between the first and second parameter.

5. The element defined in claim 4 wherein said control unit (SCU) of switch (SW) comprises:

a tag processing device (MANET), associated with each of said element inputs and connected to said switch (SW) and arranged to effect said subtraction between said first and second parameters, to generate a signal (MINUS) indicating whether or not said subtraction has given a negative result, and to form said modified tag;

a first and second register (RTMOD, RT) each associated with each element input and storing the modified and the original tag, respectively;

a first multiplexer (MX6) for associating either the modified tag or the original one with a packet to be switched;

a control logic network (SCUBRD) which: sets up connections between inputs and outputs of the switch (SW) by utilizing the routing tag, the signal (MINUS) indicating the possible negative result of the subtraction, and the signal indicating the most significant bit (TUM) among those used for forming the first parameter, controls the first multiplexer (MX6) so as to supply the switch (SW), in a time phase intended for tag transmission, with the content of the first or the second register (RTMOD, RT), stores the condition of broadcast transmission of a packet, in case the corresponding request is accepted, and controls packet forwarding to the element outputs by the output sections (RU0, RU1).

6. The element defined in claim 5 wherein said tag processing device (MANET) comprises:
  a first bit extractor (EB1), which receives the bits forming the two tag portions (TAG, BRD) and forms said first parameter (Tc);
  a second bit extractor (EB2), which receives the bits of the second tag portion (BRD) and a first bit pattern (j) indicating a serial number of the network stage to which the second bit extractor belongs and generates a second bit pattern representing the serial number (k) of such a stage in the stage sequence where broadcasting is requested;
  an arithmetic-logic unit (ALU) receiving said first parameter (Tc) and the second bit pattern (k), calculating the second parameter ($2^k$), effecting a subtraction between the two parameters and emitting on a first output the result of the subtraction itself (NTc) and said signal (MINUS) indicating the possible negative result of the subtraction;
  a priority encoder (PE) receiving the bits forming the second tag portion (BRD) and supplying a third bit pattern coding the position of the most significant bit (BUM) among those which, in said second tag portion (BRD), have a first logic value indicating the broadcasting request;
  a decoder (DE2) connected to the output of the priority encoder (PE) and generating a fourth bit pattern (de) where a single bit has a predetermined logic value and indicates, by its position, the position of said most significant bit (BUM) among those having said first logic value in the second tag portion (BRD);
  a bit recombining device (RB) receiving the bits of both tag portions (TAG, BRD), the result (NTc) of the subtraction and the fourth bit pattern (de), and emitting said modified tag;
  a second multiplexer (MX7), controlled by said third bit pattern and selecting, out of the bits of the first tag portion (TAG), said most significant bit (TUM) among those intended to build up said first parameter (Tc); and
  a register (FFT), arranged to store and keep available for said control logic network (SCUBRD) the bit selected by said second multiplexer (MX7).

7. The element defined in claim 6 wherein said first and second bit extractors (EB1,EB2) comprise a triangular matrix (MDE) of first switching circuits (DEC), matrix rows of the first bit extractor (EB1) being associated each with one bit (t(i)) of the first tag portion (TAG) and matrix rows of the second bit extractor being associated with one bit of said first bit pattern (j), matrix columns of both extractors (EB1, EB2) being associated each with one bit (b(i)) of the second tag portion (BRD), each circuit (DEC) having a first input (Ide) and a first output (Ude) which become connected to forward towards the bit extractor output the bit of the first tag portion (TAG) or respectively of said first pattern, associated with the row the circuit belongs to, when the bit of the second tag portion (BRD) associated with the column the circuit belongs to has said first logic value, and a second input (Pin) and a second output (Pou) between which complementary logic value to the first logic value is caused to propagate in the opposite case.

8. The element defined in claim 7 wherein each of said first switching circuits (DEC) comprises:
  a third multiplexer (MX8) which has a first and a second input connected to the first and the second circuit input (Ide, Pin), respectively, and an output connected to the first circuit output (Ude), receives as control signal a bit of said second tag portion (BRD) and establishes the connection between its first input and the output when said control bit has the first logic value;
  a fourth multiplexer (MX9) which has a first and a second input connected to the second and the first circuit input (Pin, Ide), respectively, and an output connected to the second circuit output (Pou), receives as control signal the same bit of said second tag portion (BRD) as the third multiplexer (MX8) and establishes the connection between its first input and the output when said control bit has a complementary logic value to the first logic value.

9. The element defined in claim 7 wherein said first bit extractor (EB1) further comprises a group of logic gates (POA) identifying the position of said most significant bit (TUM) among those designed to build up said first parameter (Tc) and forcing the logic value thereof to 1, the outputs of said gate group being connected to the first circuit of a respective row of the matrix (MDE) of the first switching circuits (DEC).

10. The element defined in claim 6 wherein said bit recombining device (RB) comprises:
  a bank of counting circuits (TA1 . . . TA3), whose number is equal to the number of bits of said second tag portion (BRD) diminished by one unit, each circuit (TA1 . . . TA3) counting the bits which have the first logic value in a respective group of bits comprising at least one bit of the second tag portion (BRD), and emitting an output signal constituting a decoded counting result, a first group consisting of the least significant bit of said second tag portion (BRD), while each subsequent group is obtained by progressively adding a more significant bit, up to a last group consisting of all the bits of the second tag portion, with the exception of the most significant bit;
  a triangular matrix (MDR) of switching circuits (RIC), whose rows are associated each with a bit of the first and second tag portions (TAG, BRD) and the columns are associated with a bit of the result (NTc) of the subtraction between the first and second parameter, each switching circuit (RIC) having a first input (Sin) and a first output (Sou) which become connected to cause said subtraction result bit to propagate along the column the circuit belongs to, when a control signal, consisting in the bit of the second tag portion (BRD) associated with the row the circuit is part of (for circuits in the first matrix column) or in the logic product between the last-mentioned bit and an output signal of said counting circuits (TA1 . . . TA3) for circuits in the other matrix columns has a complementary logic value to said first logic value, each of said switching circuits (RIC) further having a second input (Idr) and a second output (Udr) which, when said control signal has said first logic value, are connected respectively to the first output (Sou) and to the first input (Sin) to let the logic value corresponding to ground propagate along the matrix column and said subtraction result bit to propagate along the row of the matrix (MDR);

a bank of multiplexers (MXUO . . . MXU3) which are associated each with a row of the matrix (MDR) of switching circuits (RIC), each of the multiplexers of said bank having two inputs which receive respectively the signal present at the output of the associated row of the matrix (MDR) of switching circuits (RIC) and a bit of the first tag portion (TAG), as each of said multiplexers of said bank receiving control signal the logic product between corresponding bits of the second tag portion and of said fourth pattern, each multiplexer transferring to the output the signal ($ct(i)$) supplied by the respective matrix row if the bit of the second tag portion indicates a broadcasting request and is not the most significant one, and transferring to the output a bit ($t(i)$) of the first tag portion under all the other conditions.

11. The element defined in claim 10 wherein each of said switching circuits (RIC) comprises:

another multiplexer (MX10) which has a first and a second input connected to the first and second circuit input (Sin, Idr), respectively, and an output connected to the second circuit output (Udr), and establishes the connection between its first input and the output, when said control signal has the first logic value; and a further multiplexer (MX11) which has a first and a second input connected to the second and first circuit input (Idr, Sin) respectively and an output connected to the first output (Sou) of the circuit, and establishes the connection between its second input and the output, when said control signal has a complementary logic value to the first one.

12. The element defined in claim 1 wherein said control unit (SCU) of the switch (SW) further comprises a memory device (FF14) which, in case of a routing conflict, stores the identity of the input of the element (ECP) on which a packet delayed because of the conflict was present, in order to prevent said packet from being delayed also at a subsequent conflict concerning it.

13. The element defined in claim 1, further comprising, in each section (RU0, RU1) of the output unit, means (CRC) which, for each packet to be forwarded through the network, in the first network stage, generate a check work for checking the transmission regularity and transmit it after packet word transmission; in the subsequent stages check the correctness of said check word, and in the last stage check the correctness of said check word, and eliminate it before the packet transmission, and means (FF6) which, for the stages in which check word correctness is checked, are apt to delay by a time period equal to one word transmission period a signal indicating the end of packet forwarding on the element output.

14. The element defined in claim 13 wherein said check word is a cyclic redundancy code computed in parallel.

* * * * *